(12) United States Patent
Visoz et al.

(10) Patent No.: US 7,809,045 B2
(45) Date of Patent: Oct. 5, 2010

(54) DISJOINT ITERATIVE CHIP EQUALIZATION AND MULTI-USER DETECTION FOR CDMA COMMUNICATION SYSTEM ON A MIMO CHANNEL

(75) Inventors: Raphael Visoz, Issy les Moulineaux (FR); Antoine Berthet, Chatenay Malabry (FR)

(73) Assignee: France Telecom, Paris (FR)

( * ) Notice: Subject to any disclaimer, the term of this patent is extended or adjusted under 35 U.S.C. 154(b) by 646 days.

(21) Appl. No.: 11/587,223

(22) PCT Filed: Apr. 21, 2005

(86) PCT No.: PCT/EP2005/004410

§ 371 (c)(1),
(2), (4) Date: Oct. 23, 2006

(87) PCT Pub. No.: WO2005/114887

PCT Pub. Date: Dec. 1, 2005

(65) Prior Publication Data

US 2007/0217386 A1 Sep. 20, 2007

(30) Foreign Application Priority Data

Apr. 22, 2004 (EP) .................................. 04291039

(51) Int. Cl.
*H04B 1/00* (2006.01)
(52) U.S. Cl. ........................ 375/144; 375/346
(58) Field of Classification Search .............. 375/130, 375/147, 148, 144, 260, 340, 348, 346; 370/201, 370/335, 339
See application file for complete search history.

(56) References Cited

U.S. PATENT DOCUMENTS 6,993,070 B1 * 1/2006 Berthet et al. ............... 375/232

(Continued)

FOREIGN PATENT DOCUMENTS

FR  2 810 175 A  12/2001

(Continued)

OTHER PUBLICATIONS

Hongbin Li, Xuguang Lu, Giannakis, G.B, "Capon multiuser receiver for CDMA systems with space-time coding", Stevens Institute of Technology, Hoboken, NJ, May 2002, IEEE.*

(Continued)

*Primary Examiner*—Chieh M Fan
*Assistant Examiner*—Aristocratis Fotakis
(74) *Attorney, Agent, or Firm*—Cohen Pontani Lieberman & Pavane LLP

(57) ABSTRACT

The invention relates to a reception method for communication over frequency-selective channels with a plurality of send antennas and a plurality of receive antennas, to process data received by the receive antennas that, on sending, was successively modulated and spread.

To this end, reception uses:
 first linear filtering (202, 202');
 first interference subtraction (201) that uses an estimate of previously regenerated multi-antenna interference (MAI) and intersymbol interference (ISI);
 second linear filtering (205, 205');
 second interference subtraction (204) that uses an estimate of previously regenerated multi-user interference (MUI);
 processing to generate an MAI+ISI interference estimate and an MUI interference estimate for the received data from the data filtered in this way.

The invention relates further to a reception system adapted to implement the method and a transmission system including the reception system.

33 Claims, 7 Drawing Sheets

U.S. PATENT DOCUMENTS

| | | | |
|---|---|---|---|
| 7,330,519 B2 * | 2/2008 | Leclair | 375/316 |
| 2002/0018529 A1 * | 2/2002 | Dabak et al. | 375/267 |
| 2004/0062302 A1 * | 4/2004 | Fujii et al. | 375/232 |
| 2004/0116077 A1 * | 6/2004 | Lee et al. | 455/101 |
| 2005/0031024 A1 * | 2/2005 | Yang et al. | 375/219 |
| 2005/0175131 A1 * | 8/2005 | Kansanen et al. | 375/350 |
| 2006/0251149 A1 * | 11/2006 | Fujii | 375/146 |
| 2007/0217386 A1 * | 9/2007 | Visoz et al. | 370/339 |
| 2007/0223358 A1 * | 9/2007 | Visoz et al. | 370/201 |

FOREIGN PATENT DOCUMENTS

| | | |
|---|---|---|
| FR | 2 841 068 A | 12/2003 |
| WO | WO 01/19013 A | 3/2001 |

OTHER PUBLICATIONS

R. Visoz, A.O. Berthet, <<Iterative Decoding and Channel Estimation for Space-Time BICM over MIMO Block Fading Multipath AWGN Channel,>> IEEE Trans. Commun., vol. 51, No. 8, pp. 1358-1367 , Aug. 2003.*

N. Nefedov, M. Pukkila, R. Visoz, and A.O. Berthet, "terative Receiver Concept for TDMA Packet Data Systems", European Trans. on Telecommun., vol. 14, pp. 457-469, Sep.-Oct. 2003.*

France Telecom, "Iterative receiver architectures for MIMO HSDPA", REV-WS-032, presented at 3GPP Future Evolution Workshop, Toronto, Nov. 2-3, 2004.*

Berthet et al., "Iterative Decoding of Serially Concatenated Multilayered Trellis-Coded Modulations in the Presence of Intersymbol Interference and Noise", Globecom '01, 2001 IEEE Telecommunications Conference, San Antonio, TX, Nov. 25-29, 2001, IEEE Global Telecommunications Conference, New York, NY: IEEE, US, vol. 2 of 6, pp. 1042-1047, Nov. 25, 2001.

* cited by examiner

US 7,809,045 B2

DISJOINT ITERATIVE CHIP EQUALIZATION AND MULTI-USER DETECTION FOR CDMA COMMUNICATION SYSTEM ON A MIMO CHANNEL

RELATED APPLICATIONS

This is a U.S. National Phase Application under 35 USC 371 of International Application PCT/EP2005/004410, filed on Apr. 21, 2005.

GENERAL TECHNICAL FIELD

The present invention relates to the field of digital communications. It concerns how to decode efficiently digital data transmitted on a frequency-selective MIMO channel at the same time as optimizing the performance/complexity trade-off. FIG. 1 shows an overall method of transmission on a frequency-selective MIMO channel 300 between a sender 100 with T send antennas, delivering signals x[n] at the time n, and a receiver 200 with R receive antennas, receiving signals y[n] at the time n.

GENERAL DESCRIPTION OF THE PRIOR ART

Any communications system managing the access of multiple users to the same channel by allocating specific spreading codes (CDMA) is limited in capacity by multi-user interference (MUI) between users. In the context of the present invention, transmission is envisaged on a channel liable to generate other kinds of interference such as spatial multi-antenna interference (MAI) caused by multiple send antennas and intersymbol interference (ISI) caused by the frequency selectivity of the channel. On reception, these various kinds of interference are cumulative and make recovering the useful information difficult.

Pioneering work carried out by S. Verdu in the 1980s clearly demonstrated the benefit of exploiting the structural properties of multi-user interference (MUI), multi-antenna interference (MAI) and intersymbol interference (ISI) to improve performance for a fixed load (the number of users per chip) or to improve the load for fixed performance.

Many types of linear detectors have been studied, capable of supporting a greater or lesser load, which load may be evaluated analytically under asymptotic conditions. Without recourse to iterative techniques, the performance of these detectors falls far short of the performance of a maximum likelihood (ML) detector (for a system with or without coding).

The class of non-linear LIC-ID detectors based on linear iterative cancellation of the interference thus offers an excellent trade-off between performance and complexity. LIC-ID detectors use the following functions: linear filtering, weighted regeneration of interference (regardless of its nature), subtraction of the regenerated interference from the received signal. They deliver decisions on the sent modulated data (or symbols) with a reliability that increases in monotonous fashion with each new attempt. LIC-ID detectors which are intended to eliminate ISI (at block level) asymptotically achieve the performance of an optimum ML detector with a computation complexity similar to that of a linear equalizer. LIC-ID detectors intended to combat MUI approximate the performance of the optimum ML detector with a computation complexity comparable to that of a simple linear detector.

A remarkable feature of LIC-ID detectors is that they can easily be combined with hard or weighted decisions delivered by the channel decoder, thus effecting separate and iterative detection and decoding of the data.

For CDMA systems that are overloaded (by hypothesis by MUI) transmitting on frequency-selective MIMO channels, the level of interference is such that using LIC-ID receivers proves essential. If an iterative strategy is selected, the complexity of the receivers can be reduced, and rendered reasonable, only by simplifying the iterative processing as much as possible. LIC-ID detectors are treated separately for ISI and for MUI in reference [1] (see below) and in the case of ISI+MUI in reference [2] (see below).

[1] A. M. Chan, G. W. Wornell, "A New Class of Efficient Block-Iterative Interference Cancellation Techniques for Digital Communication Receivers", IEEE J. VLSI Signal Processing (Special Issue on Signal Processing for Wireless Communication Systems), vol. 30, pp. 197-215, January-March 2002.

[2] W. Wang, V. H. Poor, "Iterative (Turbo) Soft Interference Cancellation and Decoding for Coded CDMA", IEEE Trans. Commun., vol. COM-47, no. 9, pp. 2356-2374, September 1999.

Their generalization to MUI+MAI+ISI still constitutes an open subject of research, in particular because of the complexity of the processing to be effected, implying computations on particularly large matrices.

If a hypothesis of orthogonality exists between the various users on sending, one tempting approach is to re-establish orthogonality at the chip level before any attempt at multi-user detection. Optimum multi-user detection then amounts to a bank of filters matched to each user. This approach, developed in document [3] (see below) for a non-overloaded CDMA communications model transmitting on a frequency-selective SISO channel, proves to be the optimum when aperiodic spreading is considered, for example.

[3] M. Lenardi, D. T. Slock, "A Rake Receiver with Intracell Interference Cancellation for DS-CDMA Synchronous Downlink with Orthogonal Codes," IEEE VTC, pp. 430-434, 2000.

The present invention goes beyond the framework of the above reference by considering an overloaded CDMA communications model transmitting on a frequency-selective MIMO channel.

SUMMARY OF THE INVENTION

A first aspect of the invention proposes a receiving method according to any one of claims 1 to 21.

A second aspect of the invention proposes a transmission system according to claim 22.

A third aspect of the invention proposes a receiving method according to any one of claims 23 to 33.

An object of the present invention is to propose a receiver for "multicode" CDMA transmission (K>T) and/or overloaded CDMA transmission (K potential users or streams, spreading factor N<K) on frequency-selective MIMO channels (T send antennas and R receive antennas), on the general assumption of there being no CSI (i.e. no information as to the state of the channel) at the sender and a perfect knowledge of the CSI at the receiver. The receiver is based on a combination of simple mechanisms and techniques to obtain the best possible quality of service at fixed spectral efficiency and signal-to-noise ratio (SNR) or the best possible usable bit rate at fixed quality of service, band and SNR.

To this end, the invention proposes a device comprising:
Means for guaranteeing temporal decorrelation of samples of noise affecting the chips when the multiple access model with K potential users is reformed on reception assuming the absence of MAI+ISI, said means comprising chip interleaving before transmission over the MIMO channel or aperiodic spreading. Note that although chip interleaving is not necessary for internal linear aperiodic coding, it remains an option.

The invention proposes an equalization and iterative decoding device including a data detector receiving the data coming from the various send antennas comprising:

first linear filtering processing for each send antenna the MAI+ISI interference and generating statistics on the chips sent using the spatial diversity offered by the R receive antennas;

means for subtracting, before or after any linear filtering associated with each send antenna, from the received signal the MAI+ISI interference regenerated for that antenna from the available estimates of the sent modulated data (or symbolic data);

means for reordering the equalized chips into a multiple access system with K potential users in which the additive noise affecting the various chips is assumed to be Gaussian white noise;

second linear filtering processing the MUI interference on the basis of the chips previously equalized and reordered and generating statistics on the symbolic data sent by each of the K potential users;

means for subtracting, before or after any linear filtering for each user, from the observed signal the MUI interference regenerated for that user from available estimates of the symbolic data sent;

means for processing these statistics and generating probabilistic bit information usable for external decoding;

external decoding with weighted inputs and outputs, capable of generating probabilistic information referred to as extrinsic information, pertinent for the calculation of the estimates of the sent symbolic data (in the sense of the criterion of minimizing the mean square error (MMSE));

means for recursively concatenating the output of the external decoder both with the MAI+ISI interference regenerator, and with the MUI interference regenerator.

DESCRIPTION OF THE DRAWINGS

Other features and advantages of the invention will emerge from the following description, which is purely illustrative and non-limiting and should be read with reference to the appended drawings in which:

FIG. 9 relates to a sending scheme according to FIGS. 2-4 and 5-7 and FIG. 10 relates to the sending scheme described with reference to FIGS. 2-3 and 5-6;

DESCRIPTION OF PREFERRED
EMBODIMENTS OF THE PRESENT
INVENTION

1. General Structure of the Sender

Reception is intimately linked to the sending mode, which can be defined by a modulation/coding scheme of high spectral efficiency, and high adaptability capacity, based on the use of spread spectrum modulation and on the use of multiple send and receive antennas. The proposed solution is pertinent assuming no knowledge of the send channel (no CSI) and a perfect knowledge of the receive channel (CSI). The communications model is briefly described below in order to introduce a third embodiment of the present invention.

Figure 1:
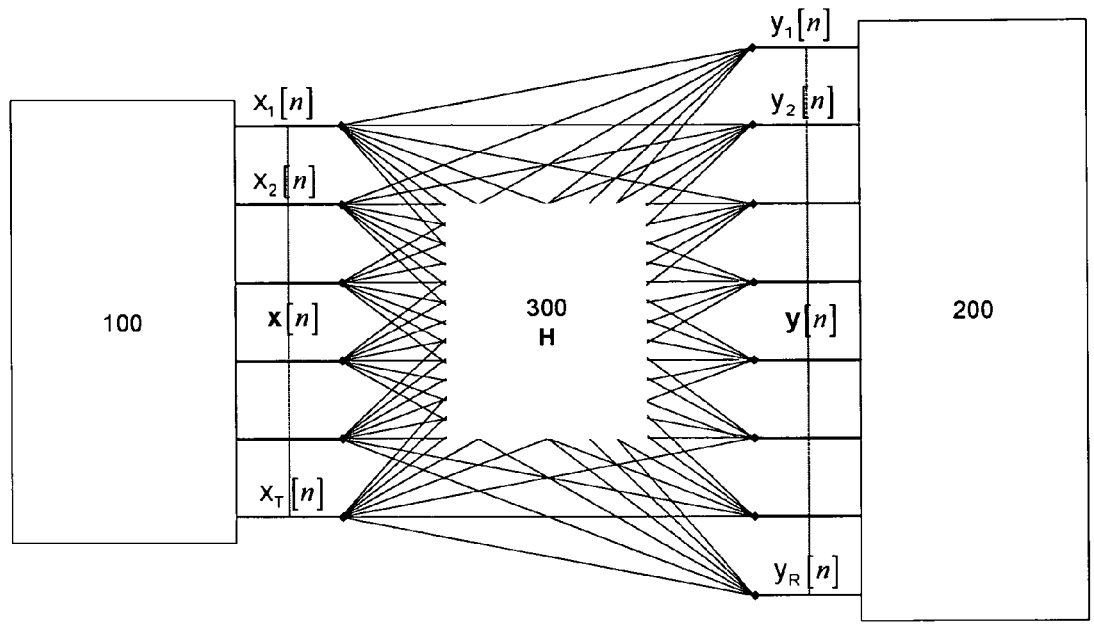
FIG. 1 illustrates a general concept of transmission on a frequency-selective MIMO channel.
Figure 2:
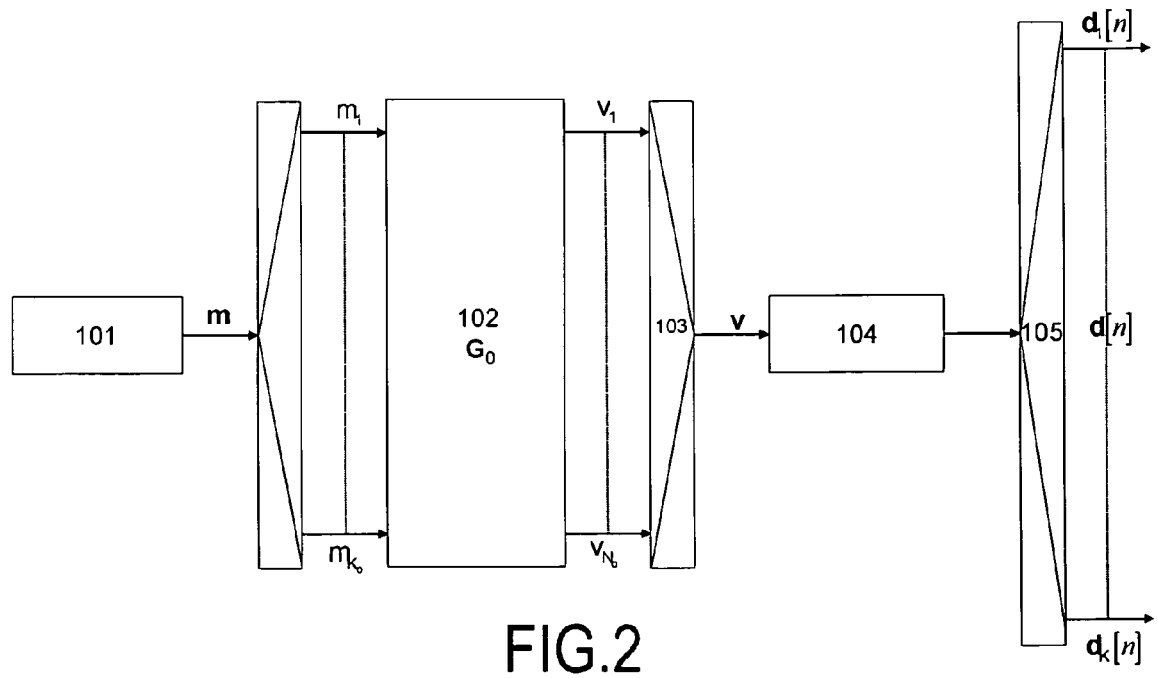
FIG. 2 shows a first part of a sending process, including external channel coding of digital information, interleaving, and demultiplexing into K streams (one for each potential user)
Figure 5:
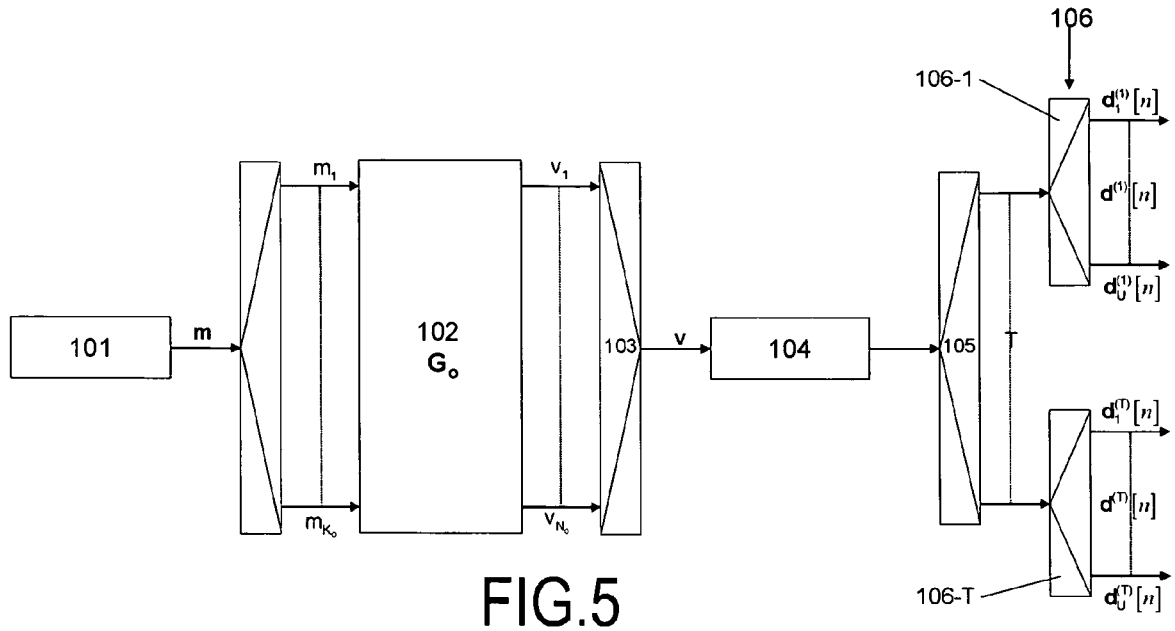
FIG. 5 shows a first part of a variant of a sending method including external channel coding of digital information, interleaving, first demultiplexing (space demultiplexing) into T streams followed by second demultiplexing (code demultiplexing) into U streams.

Referring to FIG. 2 and FIG. 5, the useful digital data is collected and grouped into a message m of $K_o$ bits constituting the send digital data source 101. In each message m, a linear external code $C_o$ having an $N_o \times K_o$ generator matrix $G_o$ and constructed on $F_2$ assigns at 102 a code word v of length $N_o$ bits defined by the matrix equation:

$$v = G_o m$$

The external coding yield is:

$$\rho = \frac{K_o}{N_o}$$

The length $N_o$ of the code words is linked to the various parameters of the system by the equation:

$$N_o = K \times L \times q$$

in which K designates the total number of potential users, L the length of the packets (in symbol times) and q the number of bits per modulation symbol. The code may be of any type, for example a convolutional code, a turbocode, an LDPC code, etc. In a multiple access type configuration, the message m consists in a plurality of multiplexed messages from different sources. Coding is effected independently on each component message. The code word v results from the concatenation 103 of the various code words produced.

The code word v is sent to an interleaver 104 operating at the bit level and, where appropriate, having a particular structure. In a multiple access type configuration, the interleaving acts piece by piece on the various code words placed one after the other. The output of this interleaver is broken up into KL sets of q bits called integers.

The stream of integers is demultiplexed 105 onto K separate channels, where K may be chosen arbitrarily to be strictly greater than the number T of send antennas. The output from this operation is a K×L integer matrix D. The L columns d[n] n=0, . . . , L−1 of this matrix D have the following structure:

$$d[n] = [\, d_1[n]^T \quad d_2[n]^T \quad \cdots \quad d_K[n]^T \,]^T \in F_2^{qK}$$

in which the component integers $d_k[n]$ k=1, . . . , K are themselves structured as follows:

$$d_k[n] = [d_{k,1}[n] d_{k,2}[n] \ldots d_{k,q}[n]]^T \in F_2^q$$

Referring to FIG. 3, 4, 6, or 7, the integers $d_k[n]$ of the matrix D are then individually modulated 107 via a modulation table $\mu: F_2^q \Rightarrow \Im$ to yield modulated data, or more precisely complex symbols $s_k[n]$ of a constellation $\Im \subset C$ with $Q=2^q$ elements. This transforms the integer matrix D into a K×L complex matrix S the L columns s[n] n=0, . . . , L−1 whereof are structured as follows:

$$s[n] \triangleq \mu(d[n]) = [s_1[n] \quad s_2[n] \ldots s_K[n]]^T \in \Im^K$$

It is useful to specify the following inverse relationships:

$$\mu^{-1}(s[n]) \triangleq d[n] \quad \mu^{-1}(s_k[n]) \triangleq d_k[n] \quad \mu_j^{-1}(s_k[n]) \triangleq d_{k,j}[n]$$

This is followed by internal linear coding (or spreading) of the data. There are several options as to the definition of the generator matrix W of the internal linear coding (more precisely: generator matrix of the internal linear coding on the body of the complexes) that may impact on the structure of the sender and on the characteristics of the linear front-ends on reception.

Periodic spreading (or internal linear coding) where W is used again in each symbol time. To guarantee temporal decorrelation of the samples of noise affecting the chips when the multiple access system is reformed after equalization, chip interleaving must be applied before transmission over the MIMO channel;

Aperiodic spreading (or internal linear coding) where $W_n$ depends explicitly on the symbol time. Aperiodic spreading guarantees temporal decorrelation of the samples of noise affecting the chips when the multiple access system is reformed after equalization. Chip interleaving is no longer necessary but remains an option.

Moreover, the spreading may be space-time (or space-frequency) spreading or only time (or frequency) spreading if it is effected independently for each antenna.

Figure 3:
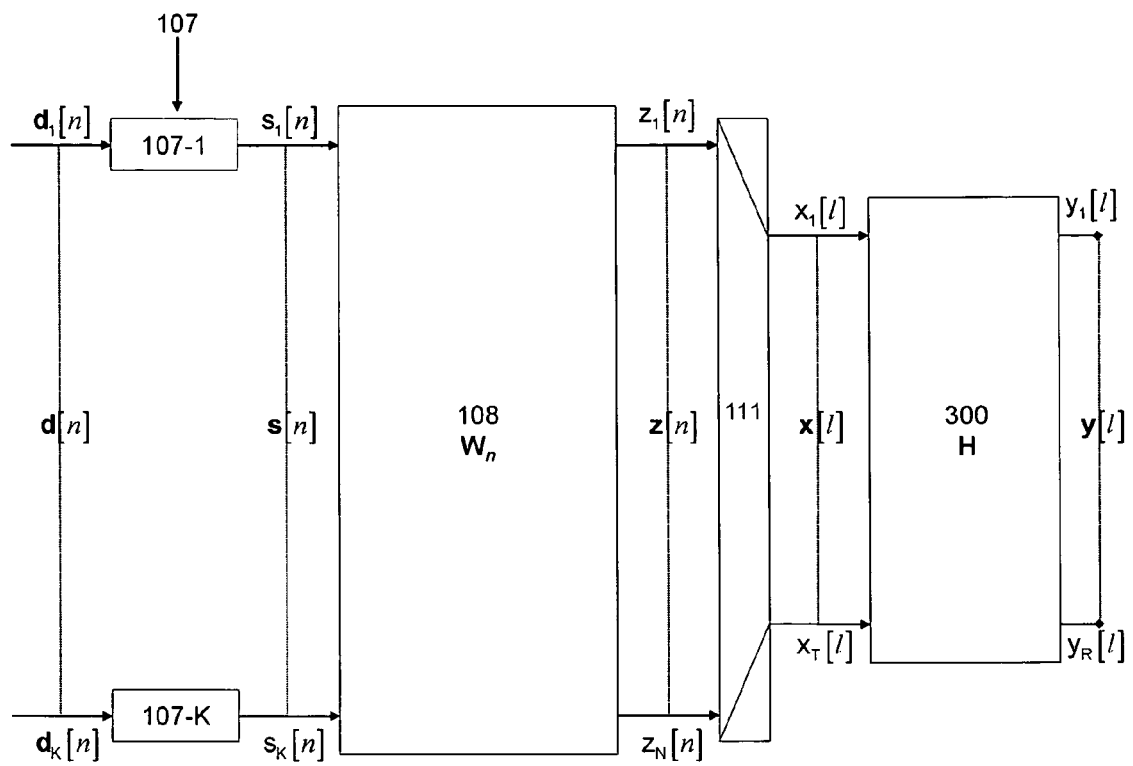
FIG. 3 shows the second part of the FIG. 2 sending process, including internal linear coding corresponding to aperiodic space-time (space-frequency) spreading followed by multiplexing onto the T send antennas.
Figure 4:
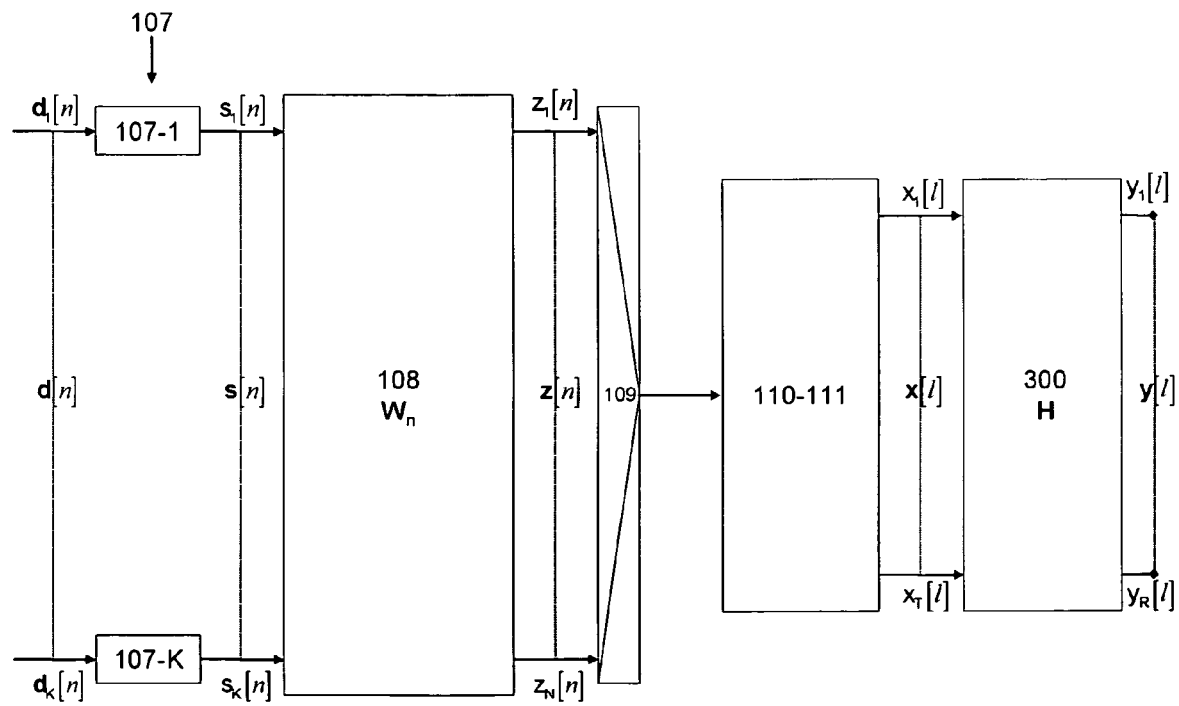
FIG. 4 shows a second portion of the FIG. 2 sending method, including internal linear coding corresponding to aperiodic space-time (or space-frequency) spreading, multiplexing onto a single channel, interleaving at chip level, and demultiplexing to the T send antennas.

1.1 Space-time (or Space-frequency) Spreading (or Internal Linear Coding) Under Overload Conditions Referring to FIG. 3 or FIG. 4, it is assumed here that aperiodic space-time (or space-frequency) spreading is effected.

The space-time (or space-frequency) spreading is effected for each matrix S by means of an N×K internal coding matrix $W_n$, which is denoted W in the periodic context), where:

$$N = T \times S_F \quad S_F \in \mathbb{Z}$$

This generator matrix is also called a spreading matrix. For example, this matrix may be considered to be constructed from N orthogonal spreading codes with spreading factor N. This internal linear coding therefore corresponds, in this case, to space-time (space-frequency) spreading with spreading factor N. The internal coding yield (or load) of the system is the ratio:

$$\alpha = \frac{K}{N}$$

The multiplication at 108 of the symbol vectors s[n] by the generator matrix $W_n$ produces a vector:

$$z[n] \triangleq W_n s[n] = [z_1[n] \quad z_2[n] \ldots z_N[n]]^T \in \mathbb{C}^N$$

The relationship may also be written at the matrix level:

$$Z \triangleq W_n S \in \mathbb{C}^{N \times L}$$

1.1.1 Spreading Followed by Chip Interleaving

Chip interleaving is necessary if the spreading is periodic ($W=W_n$) in order to be able (afterwards) to implement reception in accordance with the invention.

Referring to FIG. 4, the chip vectors z[n] n=0, . . . , L−1 are multiplexed at 109 into a single stream of chips. The chip stream then drives a chip interleaver 110, the output whereof is demultiplexed at 111 into T separate chip streams (one for each send antenna). The effect of this operation is to transform the N×L chip matrix Z:

$$Z = [z[0] \quad z[1] \ldots z[L-1]] \in \mathbb{C}^{N \times L}$$

into a $T \times LS_F$ chip matrix X:

$$X = [x[0] \quad x[1] \ldots x[LS_F - 1]] \in \mathbb{C}^{T \times LS_F}$$

the columns x[l] l=0, . . . , $LS_F-1$ whereof constitute the inputs of the MIMO channel:

$$x[l] = [x_1[l] \quad x_2[l] \ldots x_T[l]]^T \in \mathbb{C}^T$$

1.1.2 Spreading not Followed by Chip Interleaving

Referring to FIG. 3, the chip vectors z[n] n=0, . . . , L−1 are demultiplexed into T separate chip streams (111, one for each send antenna). The effect of this operation is to transform the N×L chip matrix Z:

$$Z = [z[0] \; z[1] \ldots z[L-1]] \in \mathbb{C}^{N \times L}$$

into a T×LS$_F$ chip matrix X:

$$X = [x[0] \; x[1] \ldots x[LS_F - 1]] \in \mathbb{C}^{T \times LS_F}$$

the columns x[l] l=0, . . . , LS$_F$−1 whereof constitute the inputs of the MIMO channel:

$$x[l] = [x_1[l] \; x_2[l] \ldots x_T[l]]^T \in \mathbb{C}^T$$

1.2 Time (or Frequency) Spreading (Internal Linear Coding)

Figure 6:
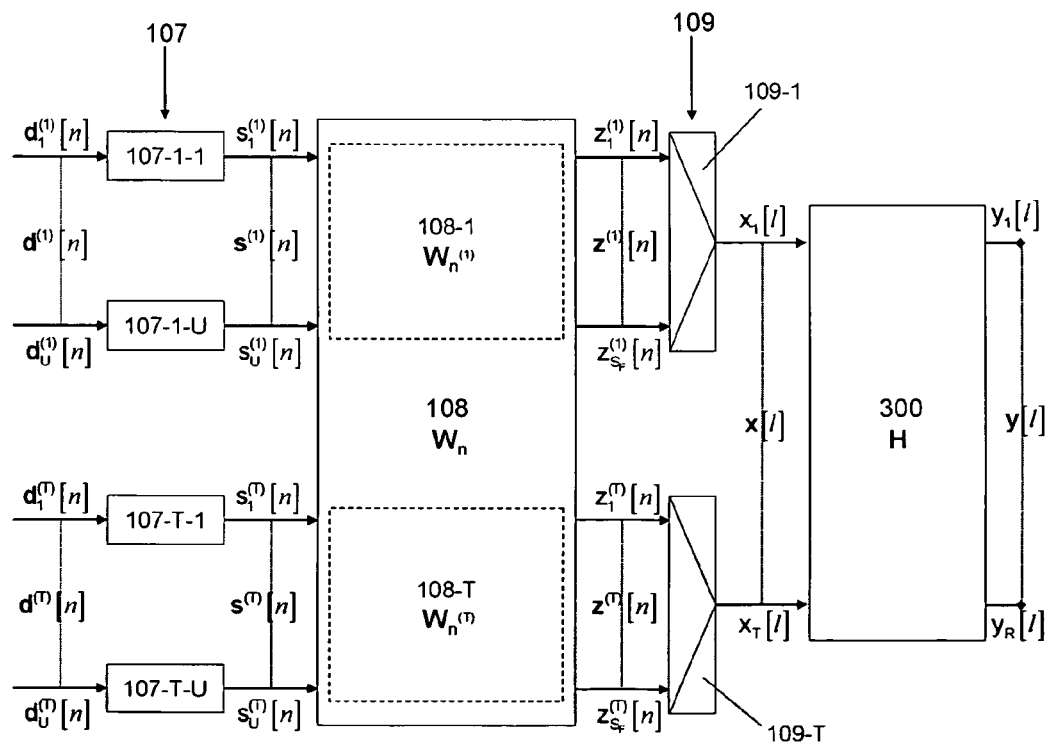
FIG. 6 shows the second part of the FIG. 5 sending method, including aperiodic time (or frequency) spreading and independent multiplexing for each antenna, compatible with the UMTS HSDPA mode.
Figure 7:
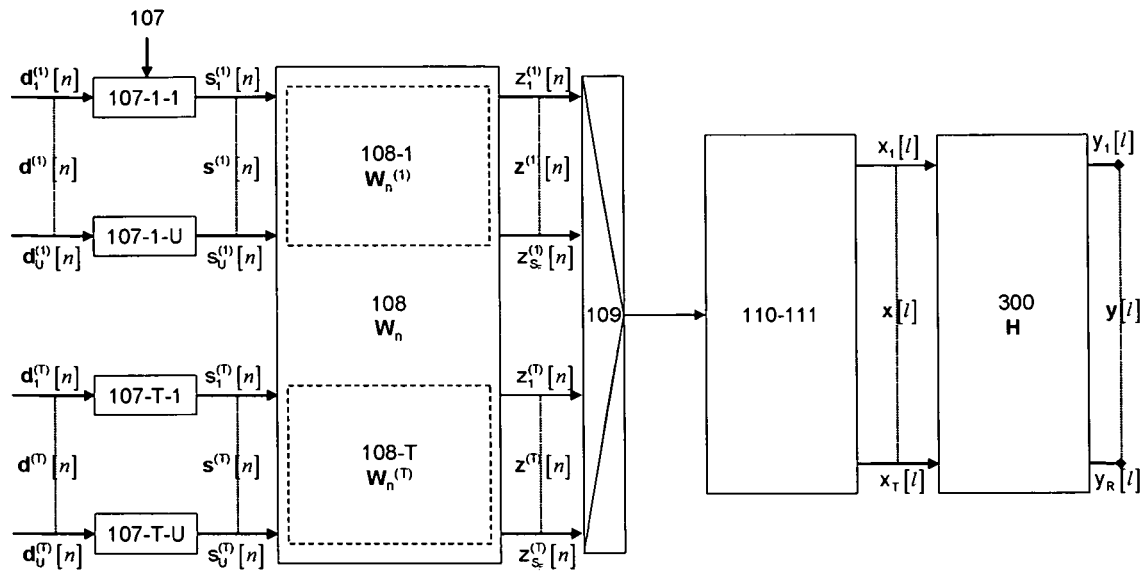
FIG. 7 shows a second portion of the FIG. 4 sending method, including aperiodic time (or frequency) spreading followed by multiplexing onto a single channel and interleaving at the chip level, followed by demultiplexing to the T send antennas, compatible with the UMTS HSDPA mode.

In this variant of the invention, shown in FIG. 6 or FIG. 7, compatible with the HSDPA mode of the UMTS standard, there are S$_F$ orthogonal codes of length S$_F$. The parameter N is always a multiple of T:

$$N = T \times S_F \quad S_F \in \mathbb{Z}$$

The S$_F$ available codes are re-used at each send antenna (this is the code re-use principle). The spreading, effected independently for each antenna, is periodic or aperiodic time (or frequency) spreading (W=W$_n$ in the periodic context).

This imposes that K be also a multiple of T:

$$K = T \times U \quad U \in \mathbb{Z}$$

This condition, which is not limiting on the invention, yields a new expression for the internal coding yield (load):

$$\alpha = \frac{U}{S_F}$$

The generator matrix W$_n$ has a block diagonal structure:

$$W_n = \begin{bmatrix} W_n^{(1)} & & & 0 \\ & W_n^{(2)} & & \\ & & \ddots & \\ 0 & & & W_n^{(T)} \end{bmatrix} \in \mathbb{C}^{N \times K}$$

the block W$_n^{(t)}$ of the generator matrix being associated with the antenna t with dimension S$_F$×U.

Referring to FIG. 5, the integer vector d[n] (demultiplexed at 105, after being coded at 102 and interleaved at 104) sent at the time n has the following particular structure:

$$d[n] = [d^{(1)}[n]^T \; d^{(2)}[n]^T \ldots d^{(T)}[n]^T]^T \in \mathbb{F}_2^{qK}$$

in which the symbol vectors d$^{(t)}$[n] t=1, . . . , T are themselves defined as follows:

$$d^{(t)}[n] = [d_1^{(t)}[n]^T \; d_2^{(t)}[n]^T \ldots d_U^{(t)}[n]^T]^T \in \mathbb{F}_2^{qU}$$

Referring to FIG. 5, the modulation 107 of this multiplexed data d[n] yields a modulated data (or symbols) vector sent at the time n having the following particular structure:

$$s[n] = [s^{(1)}[n]^T \; s^{(2)}[n]^T \ldots s^{(T)}[n]^T]^T \in \mathbb{C}^K$$

in which the symbol vectors s$^{(t)}$[n] t=1, . . . , T are themselves defined as follows:

$$s^{(t)}[n] = [s_1^{(t)}[n] \; s_2^{(t)}[n] \ldots s_U^{(t)}[n]]^T \in \mathbb{C}^U$$

The multiplication 108 of the symbol vector s[n] by the generator matrix W$_n$ produces the vector:

$$z[n] \triangleq W_n s[n]$$

which also has a particular structure:

$$z[n] = [z^{(1)}[n]^T \; z^{(2)}[n]^T \ldots z^{(T)}[n]^T]^T \in \mathbb{C}^N$$

in which the chip vectors z$^{(t)}$[n] t=1, . . . , T are themselves defined as follows:

$$z^{(t)}[n] \triangleq W_n^{(t)} s^{(t)}[n] = [z_1^{(t)}[n] \; z_2^{(t)}[n] \ldots z_{S_F}^{(t)}[n]]^T \in \mathbb{C}^{S_F}$$

1.2.1 Spreading Followed by Chip Interleaving

Chip interleaving is necessary if the spreading is periodic (W=W$_n$) in order to be able (afterwards) to implement reception in accordance with the invention.

Referring to FIG. 7, the chip vectors z[n] n=0, . . . , L−1 are multiplexed at 109 into a single stream of chips. The chip stream then drives a chip interleaver 110, the output whereof is demultiplexed at 111 into T separate chip streams (one for each send antenna). The effect of this operation is to transform the N×L chip matrix Z:

$$Z = [z[0] \; z[1] \ldots z[L-1]] \in \mathbb{C}^{N \times L}$$

into a T×LS$_F$ chip matrix X:

$$X = [x[0] \; x[1] \ldots x[LS_F - 1]] \in \mathbb{C}^{T \times LS_F}$$

the columns x[l] l=0, . . . , LS$_F$−1 whereof constitute the inputs of the MIMO channel:

$$x[l] = [x_1[l] \; x_2[l] \ldots x_T[l]]^T \in \mathbb{C}^T$$

1.2.2 Spreading not Followed by Chip Interleaving

Referring to FIG. 6, the chip vectors $z^{(t)}[n]$ are then multiplexed at 109-$t$ onto the send antenna $t$.

It will be noted that, in this sending variant, the recovery of the spatial diversity is effected via the code $G_0$ (at 102) and external bit interleaving (at 104). The overload capacity, which is known to increase with the length of the spreading codes, is lower.

The sending method fits naturally into the general class of space-time codes. The spectral efficiency of the system (in bits per use of the channel), assuming a limited band ideal Nyquist filter, is equal to:

$$\eta = T \times \rho_o \times q \times \alpha$$

In practice, the send shaping filter has a non-null overflow factor (roll-off) $\epsilon$. At the receiver, a filter matched to this send filter could be used for all the receive antennas. It is assumed that the channel estimation and timing and carrier synchronization functions are implemented so that the coefficients of the impulse response of the channel are regularly spaced by an amount equal to the chip time (channel equivalent in the discrete baseband to the discrete time). This hypothesis is legitimate, the Shannon sampling theorem imposing sampling at the rate $(1+\epsilon)/T_c$ which may be approximated by $1/T_c$ when $\epsilon$ is small. Direct generalization is possible for expressions given below for a sampling rate equal to a multiple of $1/T_c$.

2. Channel Model

Transmission is effected on a frequency-selective B-block channel with multiple inputs and multiple outputs (MIMO):

$$H \triangleq \{H^{(1)}, H^{(2)}, \ldots, H^{(B)}\}$$

The channel $H^{(b)}$ is assumed constant over $L_x$ chips with the convention:

$$L \times S_F = B \times L_X \quad B \in \mathbb{Z}$$

The chip matrix X may be segmented into B separate $T \times L_X$ chip matrices $X^{(1)}, \ldots, X^{(B)}$ (padded on the right and left with physical zeros or guard times if necessary), each matrix $X^{(b)}$ seeing the channel $H^{(b)}$.

The extreme cases of the B-block model are as follows:
B=1 and $L_X = LS_F \Rightarrow L_S = L$ quasi-static model
B=$LS_F$ and $L_X = 1 \Rightarrow L_S = 1$ ergodic (chip) model
A renumbering of the chips is applied within each block.

2.1 Convolutional Channel Model

For any block index b, the discrete time baseband equivalent channel model (chip timing) is used to write the receive vector $$y^{(b)}[l] \in \mathbb{C}^R$$

at the chip time $l$ in the form:

$$y^{(b)}[l] = \sum_{p=0}^{P-1} H_p^{(b)} x^{(b)}[l-p] + v^{(b)}[l]$$

where P is the constraint length of the channel (in chips), $$x^{(b)}[l] \in \mathbb{C}^T$$

is the complex vector of T chips sent at the chip time $l$, where $$H_p^{(b)} \in \mathbb{C}^{R \times T}$$

is the matrix coefficient indexed p of the impulse response of the block MIMO channel indexed b, and $$y^{(b)}[l] \in \mathbb{C}^R$$

is the complex additive noise vector. The complex additive noise vectors $v^{(b)}[l]$ are assumed to be independent and identically distributed in accordance with an R-dimensional Gaussian law of circular symmetry with zero mean and covariance matrix $\sigma^2 I$. The P coefficients of the impulse response are R×T complex matrices, the inputs of which are identically distributed independent Gaussian inputs, with zero mean and with a covariance matrix satisfying the global power normalization constraint:

$$E\left[diag\left\{\sum_{p=0}^{P-1} H_p^{(b)} H_p^{(b)\dagger}\right\}\right] = TI$$

in the case of a system with power equally distributed between the send antennas. Given these hypotheses, the eigen values of the correlation matrices of the coefficients of the MIMO channel conform to a Wishart distribution. It is emphasized that equal distribution of the power to the send antennas is a legitimate power allocation policy in the case of an absence of knowledge of the sending channel (no CSI).

2.2 Block Matrix Channel Model

To introduce the data decoding algorithm, we must show a matrix system on the set of the type:

$$\underline{y}^{(b)} = \underline{H}^{(b)} \underline{x}^{(b)} + \underline{v}^{(b)}$$

where:

$$\underline{y}^{(b)} \triangleq [y^{(b)}[L_X - 1 + P - 1]^\top y^{(b)}[L_X - 2 + P - 1]^\top \cdots y^{(b)}[0]^\top]^\top \in \mathbb{C}^{(L_X + P - 1)R}$$

$$\underline{v}^{(b)} \triangleq [v^{(b)}[L_X - 1 + P - 1]^\top v^{(b)}[L_X - 2 + P - 1]^\top \cdots v^{(b)}[0]^\top]^\top \in \mathbb{C}^{(L_X + P - 1)R}$$

$$\underline{x}^{(b)} \triangleq [x^{(b)}[L_X - 1]^\top x^{(b)}[L_X - 2]^\top \cdots x^{(b)}[0]^\top]^\top \in \mathbb{C}^{L_X T}$$

and where $\underline{\underline{H}}^{(b)}$ is the Sylvester matrix for the channel:

$$H^{(b)} = \begin{bmatrix} H^{(b)}_{P-1} & & & & & & & \\ H^{(b)}_{P-2} & H^{(b)}_{P-1} & & & & & & \\ & \ddots & & & & & & \\ & & H^{(b)}_0 & H^{(b)}_1 & \cdots & H^{(b)}_{P-1} & & \\ & & & H^{(b)}_0 & H^{(b)}_1 & \cdots & H^{(b)}_{P-1} & \\ & & & \ddots & \ddots & \ddots & \ddots & \\ & & & & H^{(b)}_0 & H^{(b)}_1 & \cdots & H^{(b)}_{P-1} \\ & & & & & & \ddots & \\ & & & & & H^{(b)}_0 & H^{(b)}_1 \\ & & & & & & H^{(b)}_0 \end{bmatrix} \in \mathbb{C}^{(L_S+M)RS_F \times L_S TS_F}$$

2.3 Sliding Window Matrix Channel Model

In practice, to reduce the dimensions, a sliding window model is used of length:

$$L_W = L_1 + L_2 + 1 \ll L_S$$

The following new system is obtained:

$$\underline{y}^{(b)}[n] = \underline{\underline{H}}^{(b)} \underline{x}^{(b)}[n] + \underline{v}^{(b)}[n]$$

where:

$$\underline{y}^{(b)}[l] = [y^{(b)}[l+L_1]^\top \cdots y^{(b)}[l-L_2]^\top]^\top \in \mathbb{C}^{L_W R}$$

$$\underline{x}^{(b)}[l] = [x^{(b)}[l+L_1]^\top \cdots x^{(b)}[l-L_2-P+1]^\top]^\top \in \mathbb{C}^{(L_W+P-1)T}$$

$$\underline{v}^{(b)}[l] = [v^{(b)}[l+L_1]^\top \cdots v^{(b)}[l-L_2]^\top]^\top \in \mathbb{C}^{L_W R}$$

and where $\underline{\underline{H}}^{(b)}$ is the Sylvester matrix for the channel 300:

$$H^{(b)} = \begin{bmatrix} H^{(b)}_0 & H^{(b)}_1 & \cdots & H^{(b)}_{P-1} & & & \\ & H^{(b)}_0 & H^{(b)}_1 & \cdots & H^{(b)}_{P-1} & & \\ & & \ddots & \ddots & \ddots & \ddots & \\ & & & H^{(b)}_0 & H^{(b)}_1 & \cdots & H^{(b)}_{P-1} \end{bmatrix} \in \mathbb{C}^{L_W RS_F \times (L_W+M)TS_F}$$

3. Multipath MIMO Channel Single-carrier Transmission (HSDPA)

It is assumed here that the bit rate is very high and that the coherence time of the channel is long, so that $L_x \gg S_F$. For the HSDPA mode of the UMTS standard, the channel is quasi-static, i.e. B=1.

4. Multipath MIMO Channel Multicarrier Transmission (MC-CDMA)

Figure 8:
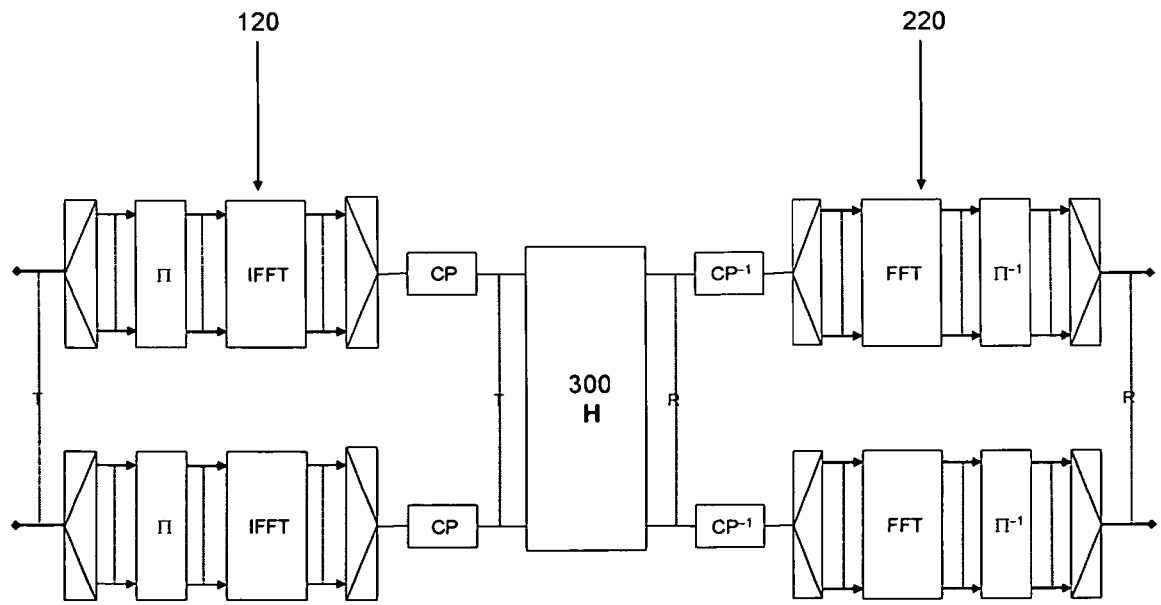
FIG. 8 shows a flat ergodic or block level fading equivalent channel obtained by decomposition of the frequency-selective MIMO channel into the Fourier base and routinely used as a model for multicarrier modulations.

The spreading (or internal linear coding) is space-frequency spreading or frequency spreading. With reference to FIG. 8, it is well known to the person skilled in the art that the introduction of a send IFFT 120 and a receive FFT 220 yields (ignoring interleaving) an equivalent channel that is not frequency selective (channel modeled by a circulating matrix using cyclic prefixes, then rendered diagonal in the Fourier base). Accordingly, each carrier sees a flat MIMO channel. Using the formalism previously described, the channel after FFT may be seen as a non-selective B-block channel (P=1). The width of the sliding window for calculating the filters is $L_W=1$.

5. General Structure of the Receiver 200

The iterative receiver 200 is divided into successive interference cancellation stages. A first stage cancels MAI+ISI interference at chip level and attempts to re-establish orthogonality within groups of users over all the antennas. The second stage cancels MUI interference once orthogonality has been re-established within the groups of users. The two stages are activated several times. Given the scale of the problem, only linear approaches based on Wiener filters (MMSE criterion) or simple (single-user) matched filters are envisaged. In both cases, a weighted version of the interference is removed before or after filtering.

5.1 Sent Symbol MMSE Estimation

On any iteration i, there is assumed an a priori knowledge of the data expressed via logarithmic ratios on the bits of the sent symbols (also referred to as modulated data):

$$\pi^i_{k,j}[n] \triangleq \ln \frac{\Pr^i[d_{k,j}[n]=1]}{\Pr^i[d_{k,j}[n]=0]}$$

By convention, these ratios have the value 0 on the first iteration.

Figure 9:
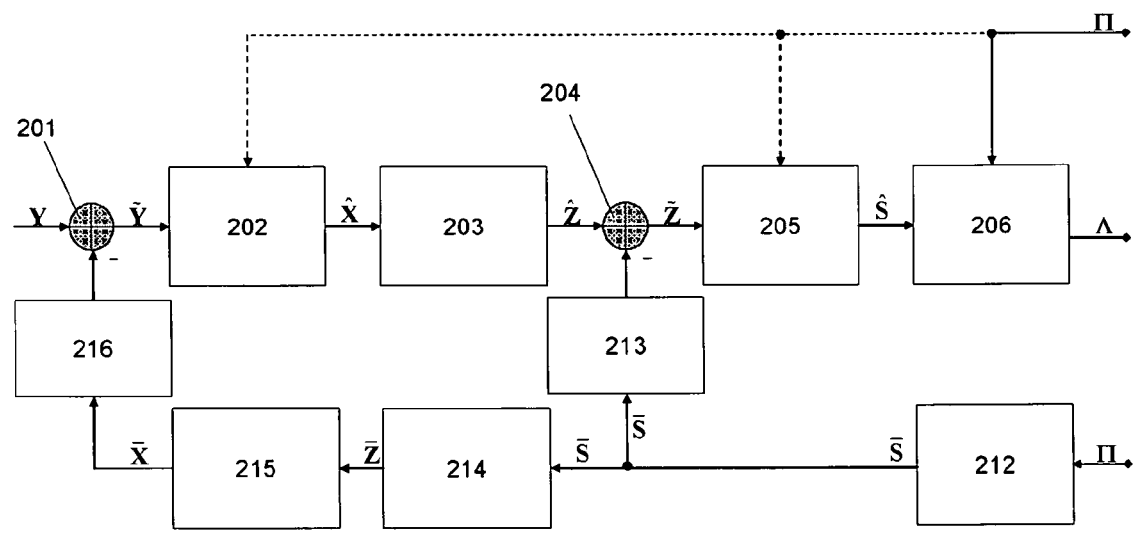
FIGS. 9 and 10 respectively show first and second variants of the architecture of a first portion of an LIC-ID receiver of the invention, in which only the functional units necessary for understanding the algorithm are indicated.
Figure 10:
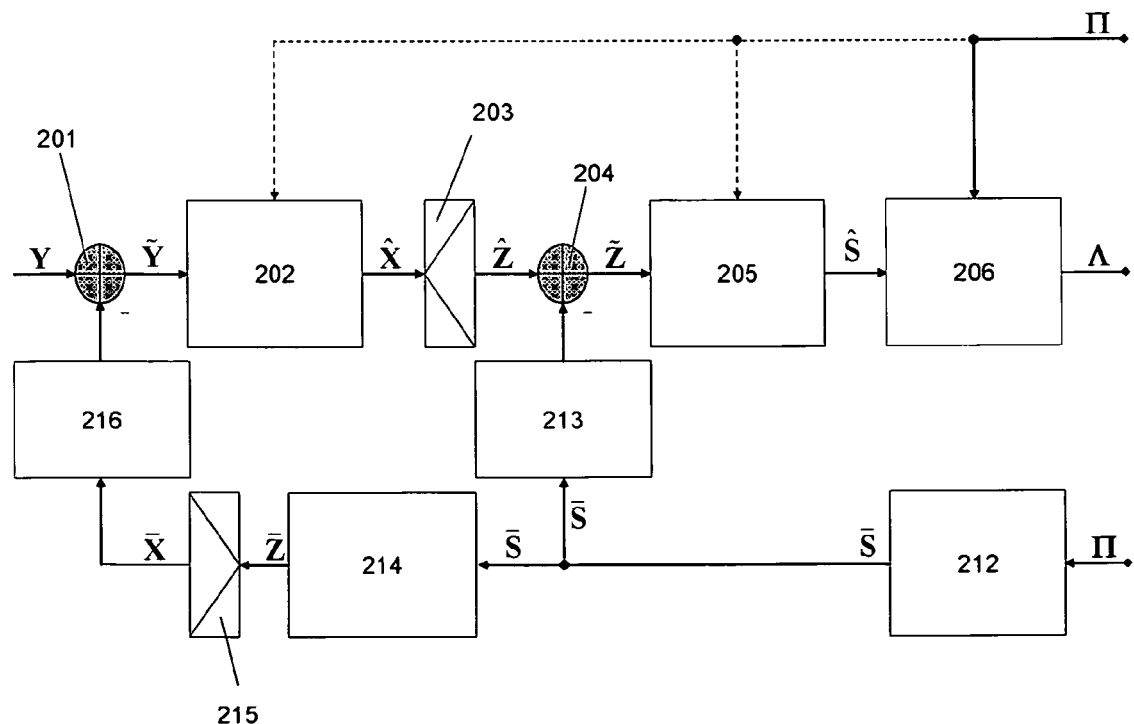

Referring to FIG. 9 or FIG. 10, on the basis of this a priori information, there can be found at 212 the matrix $\overline{S}^i$ of the estimates, in the sense of the MMSE criterion, of the symbols $s_k[n]$ sent by the users $k=1, \ldots, K$ at the times $n=0, \ldots, L-1$. The estimate of a symbol is expressed as follows:

$$\bar{s}^i_k[n] \triangleq \sum_{s \in \mathcal{S}} s \times \Pr^i[s_k[n] = s]$$

With deep space-time interleaving, the a priori probability for a symbol may be approximated by the product of the marginal probabilities of the bits that constitute it:

$$Pr^i[s_k[n] = s] \approx \prod_{j=1}^{q} Pr^i[d_{k,j}[n] = \mu_j^{-1}(s)]$$

equality being obtained for an infinite interleaving depth.

To introduce the logarithmic ratio $\pi_{k,j}^i[n]$ of the bit a priori probabilities previously defined, we may write:

$$Pr^i[s_k[n] = s] = \frac{1}{2^q}\prod_{j=1}^{q}\left\{1 + (2\mu_j^{-1}(s) - 1)\tanh\left(\frac{\pi_{k,j}^i[n]}{2}\right)\right\}$$

and finally find:

$$\bar{s}_k^i[n] = \frac{1}{2^q}\sum_{s\in\mathcal{S}} s \times \prod_{j=1}^{q}\left\{1 + (2\mu_j^{-1}(s) - 1)\tanh\left(\frac{\pi_{k,j}^i[n]}{2}\right)\right\}$$

5.2 Sent Chip MMSE Estimation

From estimated symbolic data vectors $\bar{s}^i[n]$, there may be created at 214 (by applying to the estimates the spreading matrix $W_n$ used on sending) the chip vectors estimated on each iteration i:

$$\bar{z}^i[n] = W_n\bar{s}^i[n] = [\bar{z}_1^i[n]\bar{z}_2^i[n]\cdots\bar{z}_N^i[n]]^T$$

that constitutes the estimated matrix $\bar{Z}^i$.

This is followed by processing 215 (which may comprise multiplexing, demultiplexing, chip interleaving, block division).

The processing 215 conforms to that applied on sending downstream of spreading 108 (see any of FIGS. 3, 4, 6 and 7).

For example, if the send processing comprises simple multiplexing to the T send antennas, as shown in FIGS. 3 and 6, the processing 215 comprises multiplexing onto T channels (shown in FIG. 10).

For example, if the send processing comprises multiplexing 109 onto one channel followed by chip interleaving 110 and demultiplexing (111) to the T send antennas, as shown in FIGS. 4 and 7, the receive processing 215 comprises multiplexing onto one channel, chip interleaving and demultiplexing onto T channels (shown in FIG. 9).

Following the processing 215, there are then generated (deduced from $\bar{Z}^i$) the matrices $\bar{X}^{i(1)}, \ldots, \bar{X}^{i(B)}$ the columns whereof are the vectors:

$$\bar{x}^{(b)}[l] = [\bar{x}_1^{(b)}[l]\ \bar{x}_2^{(b)}[l]\ \ldots\ \bar{x}_T^{(b)}[l]]^T \in \mathbb{C}^T$$

that are used for the linear iterative cancellation of the MAI+ISI interference at 201.

5.3 Re-establishing Orthogonality Between User Groups by Equalization to the Chip Time This section considers a given block of index b that was sent by the antenna t, assuming identical processing for all of them. The invention suggests replacing optimum detection of the chips $x_t[l]$ (in the sense of the MAP criterion) by an estimate in the sense of the (biased) MMSE criterion, derived on the basis of the sliding window model, the complexity of which is polynomial in the parameters of the system and no longer exponential. On each iteration i, there is calculated at 202 a first filter $$f_{t,l}^i \in \mathbb{C}^{L_wR}$$

which, on the basis of an updated observation (covering a portion of the block) cancels the MAI+ISI interference corrupting the chip $x_t[l]$ and produces an evaluation $\hat{x}_t[l]$ of the chips sent that minimizes the mean square error (MSE):

$$E[|\hat{x}_t[l] - x_t[l]|^2]$$

subject to the constraint of absence of bias.

An unconditional MSE would be preferable for reasons of complexity: the first filter $f_t^i$ is then invariant in time for the block concerned of the particular channel (the filter being calculated once and for all for the processed data block b).

From the vector of the estimates of the chips on the iteration i:

$$\bar{x}^i[l] = [\bar{x}_1^i[l+L_1]\ldots\ \bar{x}_t^i[l]\ldots\ \bar{x}_T^i[n-L_2-P+1]]^T \in \mathbb{C}^{(L_w+P-1)T}$$

the modified version is defined at 216, including a 0 at position $L_1T+t$, which is used to regenerate the MAI+ISI interference 216 for the symbol $x_t[l]$:

$$\bar{x}_t^i[l] = [\bar{x}_1^i[l+L_1]\ \ldots\ \bar{x}_{t-1}^i[l]\ 0\ \bar{x}_{t+1}^i[l]\ldots\ \bar{x}_T^i[l-L_2-P+1]]^T \in \mathbb{C}^{(L_w+P-1)T}$$

An estimate of MAI+ISI interference is therefore regenerated at 216 by multiplying this vector by said Sylvester matrix $\underline{H}$ (its calculation is described above in section 2.2 or 2.3):

$$\underline{H}\bar{x}_t^i[l]$$

The first (Wiener) filter 202 is applied to the observation vector obtained after subtraction at 201 of the regenerated MAI+ISI interference:

$$\underline{\tilde{y}}^i[l] = \underline{y}[l] - \underline{H}\bar{x}_t^i[l]$$

This first filter 202 minimizes the unconditional MSE on the (biased) estimate of the chip $x_t[l]$ and may easily be derived from the orthogonal projection theorem:

$$f_t^i = e_t^\dagger H^\dagger [H\Xi_t^i H^\dagger + \sigma^2 I]^{-1}$$

where $e_t$ is the vector of dimension $(L_W+P-1)T$ having a 1 at position $L_1T+t$ and zeroes everywhere else and where:

$$\Xi_t^i \triangleq E\{(x[l] - \bar{x}_t^i[l])(x[l] - \bar{x}_t^i[l])^\dagger\} \in \mathbb{C}^{(L_W+P-1)T \times (L_W+P-1)T}$$

$$\Xi_t^i = \text{diag}\{(\sigma_x^2 - \sigma_{\bar{x}}^{i2})I, \ldots, (\sigma_x^2 - \sigma_{\bar{x}}^{i2})I, \sigma_x^2 I, (\sigma_x^2 - \sigma_{\bar{x}}^{i2})I, \ldots, (\sigma_x^2 - \sigma_{\bar{x}}^{i2})I\}$$

with the term $\sigma_x^2 I$ situated at the position $L_1T+t$ on the diagonal and $\sigma_{\bar{x}}^{i2}$ evaluated using the following estimator:

$$\sigma_{\bar{x}}^{i2} \approx \hat{\sigma}_{\bar{x}}^{i2} \triangleq \frac{1}{TL_X} \sum_{t=1}^{T} \sum_{l=0}^{L_X-1} |\bar{x}_t^i[l]|^2$$

To satisfy the absence of bias constraint, the filter must be multiplied on the left by the correction factor:

$$\{e_t^\dagger \underline{H}^\dagger [\underline{H}\Xi_t^i\underline{H}^\dagger + \sigma^2 I]^{-1} \underline{H} e_t\}^{-1}$$

The following final expression for the filter is obtained:

$$f_t^i = \{e_t^\dagger \underline{H}^\dagger [\underline{H}\Xi_t^i\underline{H}^\dagger + \sigma^2 I]^{-1} \underline{H} e_t\}^{-1} e_t^\dagger \underline{H}^\dagger [\underline{H}\Xi_t^i\underline{H}^\dagger + \sigma^2 I]^{-1}$$

Alternatively, this filter may be replaced, completely or from a different iteration i ($i \geq 1$), by its single user matched filter (SUMF) version, given by:

$$f_t^i = \{e_t^\dagger \underline{H}^\dagger \underline{H} e_t\}^{-1} e_t^\dagger \underline{H}^\dagger$$

The evaluation of the chip $x_t[l]$ then corresponds, at the output of the first filter 202, to:

$$\hat{x}_t^i[l] = f_t^i[y[l] - \underline{H}\bar{x}_t^i[l]] = x_t[l] + \zeta_t^i[l]$$

The variance of the residual MAI+ISI interference plus noise is then equal to:

$$\sigma_{\zeta_t}^{i2} = \sigma_x^2[(f_t^i H e_t)^{-1} - 1]$$

and may in practice be evaluated using the following estimator:

$$\sigma_{\zeta_t}^{i2} \approx \hat{\sigma}_{\zeta_t}^{i2} \triangleq \frac{1}{L_X} \sum_{l=0}^{L_X-1} |\hat{x}_t^i[l]|^2 - \sigma_x^2$$

Figure 11A:
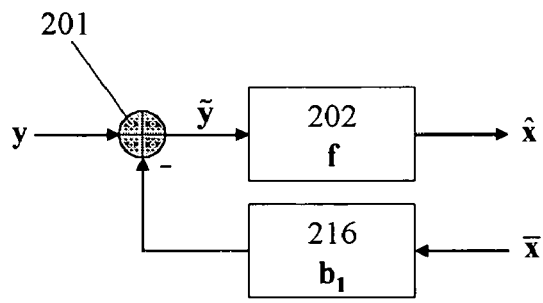
FIGS. 11a and 11b represent two equivalent methods of implementing LIC-ID receivers for processing MAI+ISI interference, the FIG. 11a implementation method representing the filtering and MAI+ISI interference regeneration parts of the first part of the overall detector shown in FIG. 9 or FIG. 10.
Figure 11B:
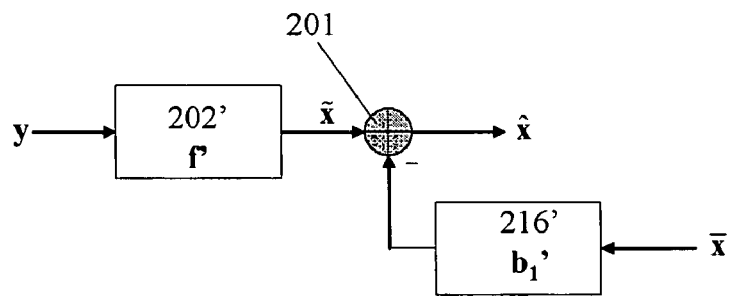

Other Possible Equalization Variant:

FIG. 11*b* shows a variant of the first filtering 202' and the regeneration of MAI+ISI interference 210', to be compared with the first filtering 202 and the regeneration of MAI+ISI interference 210 of FIG. 11*a* (representing these two detection steps included in the FIG. 9 or 10 scheme).

Referring to FIG. 11*b*, here the first filtering 202' is effected upstream of the first subtraction 201 of the MAI+ISI interference regenerated at 210', and not downstream thereof as is the case in FIG. 11*a*.

The first filter f' used and the MAI+ISI interference reconstruction matrix here denoted $b_1$' used can be deduced trivially from the first filter f and the MAI+ISI interference reconstruction matrix here denoted $b_1$ previously calculated (see above description with reference to FIGS. 9 or 10 and 11*a*), from the following equation:

$$\hat{x} = f(y - b_1\bar{x}) = fy - b_1\bar{x}$$

In order then to deduce therefrom:

$$f' = f; b_1' = fb_1$$

5.4 Equivalent Gaussian Multiple Access and Multi-user Detection Model

The two situations distinguished on sending (i.e. space-time (space-frequency) spreading, and time (or frequency) spreading) produce 1 or T different multiple access models.

5.4.1 Space-time (or Space-frequency) Send Spreading

Referring to FIGS. 9 and 10, the chip matrices $\hat{X}^{i(1)}, \ldots, \hat{X}^{i(B)}$ are here grouped into a single matrix $\hat{X}$, which in turn is reorganized, after processing 203, into a single N×L matrix $\hat{Z}^i$; the processing 203 corresponds to the converse of the processing 215 described in section 5.2.

There is then obtained a (canonic) Gaussian equivalent multiple access model of the type:

$$\hat{Z}^i = X + Y^i = WS + Y^i$$

The observed chip matrix is denoted:

$$\hat{Z}^i = [\hat{z}^i[0] \ \hat{z}^i[1] \ \ldots \ \hat{z}^i[L-1]] = \begin{bmatrix} \hat{z}_1^i[0] & \hat{z}_1^i[1] & \ldots & \hat{z}_1^i[L-1] \\ \hat{z}_2^i[0] & \hat{z}_2^i[1] & \ldots & \hat{z}_2^i[L-1] \\ \vdots & \vdots & \ddots & \vdots \\ \hat{z}_N^i[0] & \hat{z}_N^i[1] & \ldots & \hat{z}_N^i[L-1] \end{bmatrix} \in \mathbb{C}^{N \times L}$$

The matrix of samples of noise in time is denoted:

$$\Upsilon^i = [v^i[0] \ v^i[1] \ \ldots \ v^i[L-1]] = \begin{bmatrix} v_1^i[0] & v_1^i[1] & \ldots & v_1^i[L-1] \\ v_2^i[0] & v_2^i[1] & \ldots & v_2^i[L-1] \\ \vdots & \vdots & \ddots & \vdots \\ v_N^i[0] & v_N^i[1] & \ldots & v_N^i[L-1] \end{bmatrix} \in \mathbb{C}^{N \times L}$$

For each time n, we set:

$$\Xi_{v[n]}^i \triangleq E\{v^i[n] v^i[n]^\dagger\} = \begin{bmatrix} \sigma_{v_1[n]}^{i2} & & & \\ & \sigma_{v_2[n]}^{i2} & & \\ & & \ddots & \\ & & & \sigma_{v_N[n]}^{i2} \end{bmatrix} \in \mathbb{C}^{N \times N}$$

The matrix of covariance of the residual MAI+ISI interference plus noise vectors. This is made diagonal either thanks to the chip de-interleaving included at 203 or the aperiodic nature of the spreading. Its diagonal elements are deduced from the variances previously estimates:

$$\hat{\sigma}_{\zeta_t}^{i2} t = 1, \ldots, T$$

To simplify subsequent processing (MMSE multi-user detection), a variance of the noise samples that is constant for the whole of the system may be assumed:

$$\sigma_{v_l[n]}^{i2} \approx \hat{\sigma}_v^{i2} = \frac{1}{NL} \sum_{n=0}^{L-1} \sum_{l=1}^{N} |\hat{z}_l^i[n]|^2 - \sigma_z^2 \ \forall \ l = 1, \ldots, N$$

The temporal dependency is then eliminated:

$$\Xi_{v[n]}^i = \Xi_v^i = \sigma_{98}^{i2} I \forall n = 0, \ldots, L-1$$

5.4.1.1 Periodic Space-time (Space-frequency) Send Spreading

As seen above, when the spreading is periodic, a chip interleaver (110) is used on sending, so that the processing 203 includes chip de-interleaving (see FIG. 9).

Variant 1: Overloaded Regime: MMSE Multi-user Detection

Here the optimum detection of the symbols $s_k[n]$ (in the sense of the MAP criterion) is replaced by a non-biased MMSE evaluation the complexity whereof is polynomial in the parameters of the system and not exponential. On each iteration i, for each potential user k, there is calculated at 204 a second filter $$g_{k,n}^i \in \mathbb{C}^N$$

which, on the basis of an updated observation (relating to the column indexed n of the preceding model), eliminates the MUI interference corrupting the symbol $s_k[n]$ and produces an evaluation $\hat{s}_k^i[n]$ of the sent modulated data (or symbols) that minimizes the mean square error (MSE):

$$E[s_k[n] - \hat{s}_k^i[n]]$$

subject to the constraint of the absence of bias. An unconditional MSE would be preferable for reasons of complexity: the second filter $g_k^i$ is then invariant in time for the block concerned of the particular channel (i.e. calculated once and for all over the whole of the block being processed).

From the vector of the estimates of the symbols at the iteration i:

$$\bar{s}^i[n] = [\bar{s}_1^i[n] \ \bar{s}_2^i[n] \ldots \bar{s}_K^i[n]]^T \in \mathbb{C}^K$$

it is possible to define at 213 the modified version, including a 0 at position k, that is used for the regeneration 213 of the MUI interference for the symbol $s_k[n]$:

$$\bar{s}_k^i[n] = [\bar{s}_1^i[n] \ldots \bar{s}_{k-1}^i[n] \ 0 \ \bar{s}_{k+1}^i[n] \ldots \bar{s}_K^i[n]]^T \in \mathbb{C}^K$$

An estimate of the MUI interference is therefore regenerated at 213 by multiplying the latter vector by the spreading matrix W used on sending:

$$W\bar{s}_k^i[n]$$

The second (Wiener, biased) filter is then applied at 205 to the observation vector obtained following subtraction 204 of this regenerated MUI interference:

$$\tilde{z}_k^i[n] = \hat{z}^i[n] - W\bar{s}_k^i[n]$$

This second filter 205 minimizes the unconditional MSE on the estimate of the symbol $s_k[n]$ and can easily be derived using the theorem of orthogonal projection:

$$g_k^i = e_k^\dagger W^\dagger [W \Xi_k^i W^\dagger + \sigma_v^{i2} I]^{-1}$$

where $e_k$ is the vector of dimension K have a 1 at position k and zeros everywhere else and where:

$$\Xi_k^i \triangleq E\{(s[n] - \bar{s}_k^i[n])(s[n] - \bar{s}_k^i[n])^\dagger\} \in \mathbb{C}^{K \times K}$$

$$\Xi_k^i = \text{diag}\{\sigma_s^2 - \sigma_{s_k}^{i2}, \ldots, \sigma_s^2 - \sigma_{s_k}^{i2}, \sigma_s^2, \sigma_s^2 - \sigma_{s_k}^{i2}, \ldots, \sigma_s^2 - \sigma_{s_k}^{i2}\}$$

with $\sigma_s^2$ situated at the position k on the diagonal and $\sigma_s^{i2}$ evaluated using the following estimator:

$$\sigma_{s_k}^{i2} \approx \hat{\sigma}_{s_k}^{i2} \triangleq \frac{1}{L} \sum_{n=0}^{L-1} |\bar{s}_k^i[n]|^2$$

To satisfy the constraint of absence of bias, the second filter must be multiplied on the left by the correction factor:

$$\{e_k^\dagger W^\dagger [W \Xi_k^i W^\dagger + \sigma_v^{i2} I]^{-1} W e_k\}^{-1}$$

The final expression for the second filter is then obtained:

$$g_k^i = \{e_k^\dagger W^\dagger [W \Xi_k^i W^\dagger + \sigma_v^{i2} I]^{-1} W e_k\}^{-1} e_k^\dagger W^\dagger [W \Xi_k^i W^\dagger + \sigma_v^{i2} I]^{-1}$$

The evaluation of the symbol $s_k[n]$ corresponds at the output of the second filter 205 to:

$$\hat{s}_k^i[n] = g_k^i[\hat{z}^i[n] - W\bar{s}_k^i[n]] = s_k[n] + \xi_k^i[n]$$

The variance of the residual MUI interference plus noise term $\xi_k^i[n]$ can be evaluated via the following estimator:

$$\sigma_{\xi_k}^{i2} \approx \hat{\sigma}_{\xi_k}^{i2} \triangleq \frac{1}{L} \sum_{n=0}^{L-1} |\hat{s}_k^i[n]|^2 - \sigma_s^2$$

Variant 2: Overloaded Regime: SUMF (Single User Matched-filter) Detection

In a simplified version, the second MMSE filter at 205 may be replaced from any iteration i by a second SUMF filter:

$$g_k^i = \{e_k^\dagger W^\dagger W e_k\}^{-1} e_k^\dagger W^\dagger$$

The following evaluation is obtained:

$$\hat{s}_k^i[n] = g_k^i[\hat{z}^i[n] - W\bar{s}_k^i[n]]$$

This approach avoids calculating N×N inverse matrices.

Variant 3: Non-overloaded Regime

In the non-overloaded situation, we have:

$$W^\dagger W = I$$

Detection amounts to applying the second filter $g_k^i = e_k^\dagger W^\dagger$ at 205 to the observation vector.

The evaluation is then obtained directly from:

$$\hat{s}_k^i[n] = e_k^\dagger W^\dagger \hat{z}^i[n]$$

5.4.1.2 Aperiodic Space-time (Space-frequency) Spreading

In this case, the processing 203 may or may not include chip de-interleaving as described with reference to FIGS. 9 and 10. The (canonic) Gaussian equivalent multiple access model is now written:

$$\hat{z}^i[n] = W_n s[n] + \upsilon^i[n]$$

Only SUMF type detection is of reasonable complexity in the aperiodic context, and is therefore preferably used.

Variant 1: Overloaded Regime

The filter then has the following expression:

$$g_k^i = \{e_k^\dagger W_n^\dagger W_n e_k\}^{-1} e_k^\dagger W_n^\dagger$$

Variant 2: Non-overloaded Regime

The filter then has the following expression:

$$g_k^i = e_k^\dagger W_n^\dagger$$

5.4.2 Time (or Frequency) Send Spreading

The chip matrices $\hat{X}^{i(1)}, \ldots, \hat{X}^{i(B)}$ are grouped into a unique matrix $\hat{X}$. Following the processing 203, and with reference to FIGS. 9 and 10, $\hat{X}$ is reorganized into T $S_F \times L$ matrices $\hat{Z}^{i(1)}, \ldots, \hat{Z}^{i(T)}$ corresponding to T independent (canonic) Gaussian equivalent multiple access models of the type:

$$\hat{Z}^{i(t)} = Z^{(t)} + Y^{i(t)} = W^{(t)} S^{(t)} + Y^{i(t)}$$

The observed chip matrix is denoted:

$$\hat{Z}^{i(t)} = [\hat{z}^{i(t)}[0]\ \hat{z}^{i(t)}[1]\ \ldots\ \hat{z}^{i(t)}[L-1]] = \begin{bmatrix} \hat{z}_1^{i(t)}[0] & \hat{z}_1^{i(t)}[1] & \ldots & \hat{z}_1^{i(t)}[L-1] \\ \hat{z}_2^{i(t)}[0] & \hat{z}_2^{i(t)}[1] & \ldots & \hat{z}_2^{i(t)}[L-1] \\ \vdots & \vdots & \ddots & \vdots \\ \hat{z}_{S_F}^{i(t)}[0] & \hat{z}_{S_F}^{i(t)}[1] & \ldots & \hat{z}_{S_F}^{i(t)}[L-1] \end{bmatrix} \in \mathbb{C}^{S_F \times L}$$

The matrix of the samples of noise decorrelated in time:

$$\Upsilon^{i(t)} = [\upsilon^{i(t)}[0]\ \upsilon^{i(t)}[1] \ldots \upsilon^{i(t)}[L-1]] = \begin{pmatrix} \upsilon_1^{i(t)}[0] & \upsilon_1^{i(t)}[1] & \ldots & \upsilon_1^{i(t)}[L-1] \\ \upsilon_2^{i(t)}[0] & \upsilon_2^{i(t)}[1] & \ldots & \upsilon_2^{i(t)}[L-1] \\ \vdots & \vdots & \ddots & \vdots \\ \upsilon_{S_F}^{i(t)}[0] & \upsilon_{S_F}^{i(t)}[1] & \ldots & \upsilon_{S_F}^{i(t)}[L-1] \end{pmatrix} \in \mathbb{C}^{S_F \times L}$$

For each time, we set:

$$\Xi_{\upsilon^{(t)}[n]}^i \triangleq E\{\upsilon^{i(t)}[n]\upsilon^{i(t)}[n]^\dagger\} = \begin{bmatrix} \sigma_{\upsilon_1^{(t)}[n]}^{i2} & & & \\ & \sigma_{\upsilon_2^{(t)}[n]}^{i2} & & \\ & & \ddots & \\ & & & \sigma_{\upsilon_{S_F}^{(t)}[n]}^{i2} \end{bmatrix} \in \mathbb{C}^{S_F \times S_F}$$

the matrix of covariance of the residual MAI+ISI interference plus noise vectors. This is made diagonal either by the chip de-interleaving included in the processing 203 or by the aperiodic character of the spreading. Its diagonal elements are deduced by the variances previously estimated over the various blocks processed:

$$\hat{\sigma}_{\zeta_t}^{i2} t = 1, \ldots, T$$

To simplify subsequent processing (MMSE multi-user detection), a constant variance of the noise samples for the whole of the system may be assumed:

$$\sigma_{\upsilon_l^{(t)}[n]}^{i2} \approx \hat{\sigma}_\upsilon^{i(t)2} = \frac{1}{SFL}\sum_{n=0}^{L-1}\sum_{l=1}^{SF} |\hat{z}_l^{i(t)}[n]|^2 - \sigma_z^2 \forall\, l = 1, \ldots, N$$

The temporal dependency is then eliminated:

$$\Xi_{\upsilon^{(t)}[n]}^i = \Xi_{\upsilon}^{i(t)} = \sigma_\upsilon^{i(t)2} I \forall n = 0, \ldots, L-1$$

The calculations of the filters $g_u^{i(t)}$ for each multiple access model being similar to those described above, they will not be explained here.

5.4.2.1 Periodic Time (or Frequency) Send Spreading

As previously explained, when the spreading is periodic, a chip interleaver (110) is used on sending, and so the processing 203 includes chip de-interleaving as described with reference to FIG. 9.

Variant 1: Overloaded Regime: MMSE Multi-user Detection

The filter then has the following expression:

$$g_u^{i(t)} = \{e_u^\dagger W^{(t)\dagger}[W^{(t)}\Xi_u^i W^{(t)\dagger} + \sigma_\upsilon^{i2} I]^{-1} W^{(t)} e_u\}^{-1} e_u^\dagger W^{(t)\dagger}[W^{(t)}\Xi_u^i W^{(t)\dagger} + \sigma_\upsilon^{i2} I]^{-1}$$

Variant 2: Overloaded Regime: SUMF (Single User Matched-Filter) Detection

From any iteration i, the MMSE filter may be replaced by its sub-optimum SUMF version:

$$g_u^{i(t)} = \{e_u^\dagger W^{(t)\dagger} W^{(t)} e_u\}^{-1} e_u^\dagger W^{(t)\dagger}$$

Variant 3: Non-overloaded Regime

The filter then has the following expression:

$$g_u^i = e_u^\dagger W^{(t)\dagger}$$

5.4.2.2 Periodic Aperiodic Time (or Frequency) Send Spreading

In this case, the processing 203 may or may not include chip de-interleaving as described with reference to FIGS. 9 and 10. The T (canonic) Gaussian equivalent multiple access models are now written:

$$\hat{z}^{i(t)}[n] = W_n^{(t)} s^{(t)}[n] + \upsilon^{i(t)}[n]$$

Only SUMF-type detection is of reasonable complexity in the aperiodic context.

Variant 1: Overloaded Regime

The filter then has the following expression:

$$g_u^{i(t)} = \{e_u^\dagger W_n^{(t)\dagger} W_n^{(t)} e_u\}^{-1} e_k^\dagger W_n^{(t)\dagger}$$

Variant 2: Non-overloaded Regime

The filter then has the following expression:

$$g_u^{i(t)} = e_u^\dagger W_n^{(t)\dagger}$$

Figure 12A:
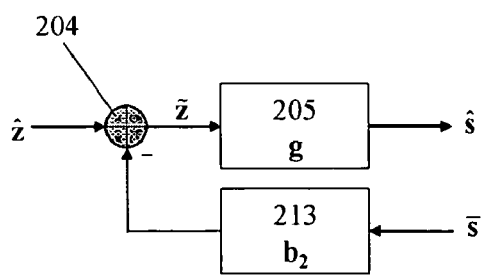
FIGS. 12a and 12b represent two equivalent methods of implementing LIC-ID receivers for processing MUI interference, the implementation method of FIG. 12a representing the filtering and MUI interference regeneration parts of the first part of the overall detector shown in FIG. 9 or FIG. 10.

Other Possible Equalization Variant:

Regardless of the variants explained in sections 5.4.1 and 5.4.2, there is also a variant as to how to effect the second filtering 205' and the MUI interference regeneration 213' (described with reference to FIG. 12*b*), to be compared to the second filtering 205 and the MUI interference regeneration 213 of FIG. 12a (representing these two detection steps included in the FIG. 9 or 10 scheme).

Figure 12B:
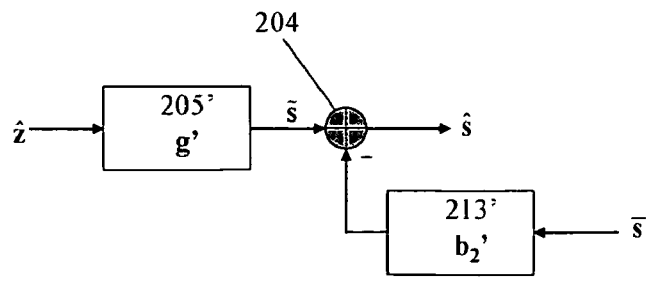

Referring to FIG. 12b, the second filtering 205' is here effected upstream of the second subtraction 204 of interference regenerated at 213', rather than downstream thereof as in FIG. 12a.

The second filter g' used and the MUI interference reconstruction matrix $b_2'$ used may be deduced trivially from the second filter g and the MUI interference reconstruction matrix $b_2$ previously computed (see above description with reference to FIGS. 9 or 10 and 12a), from the following condition of equality:

$$\hat{s} = g(\hat{z} - b_2 \tilde{s}) = g'\hat{z} - b_2'\tilde{s}$$

From which we deduce:

$$g' = g; b_2' = gb_2$$

5.5 Exchange of Probabilistic Information with the Channel Decoder

Figure 13:
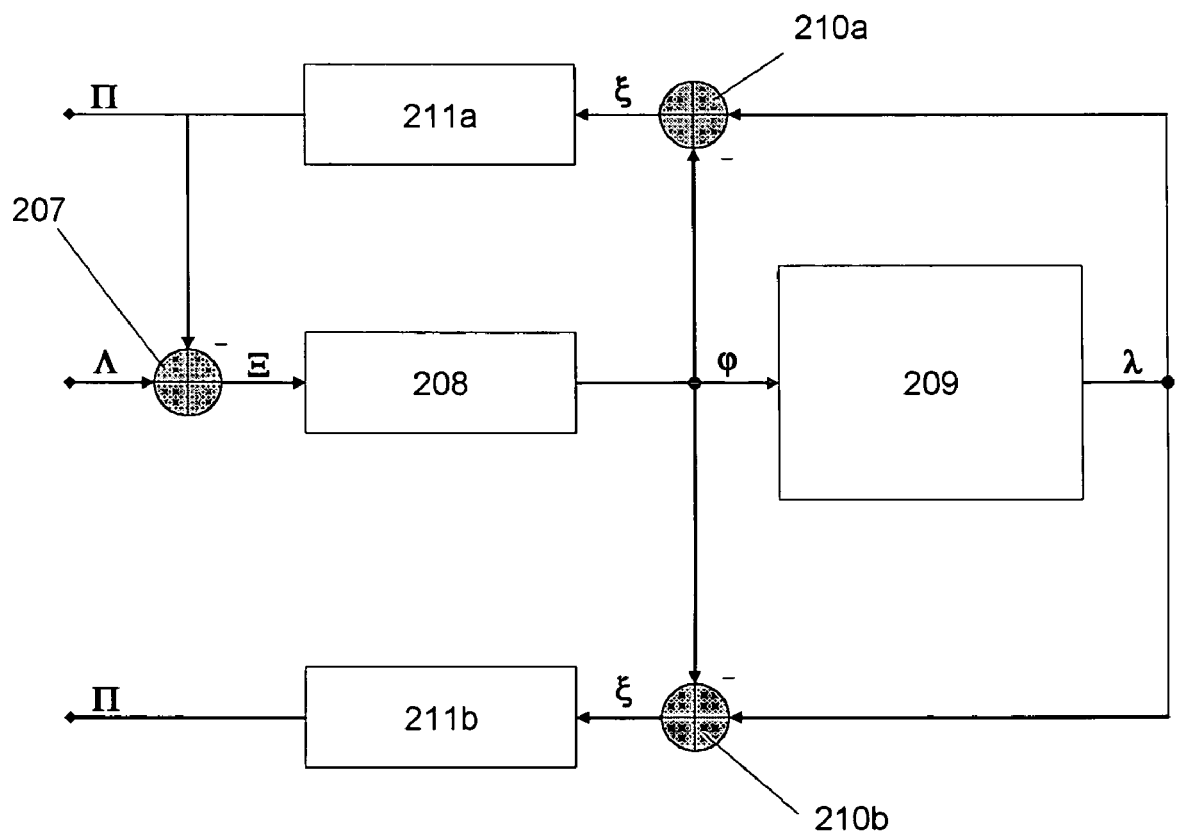
FIG. 13 shows the architecture of the second part of the LIC-ID receiver according to the invention (the first portion of the detector being represented by FIG. 9 or FIG. 10), in which only the functional units necessary for understanding the algorithm are indicated.

On the basis of the output of the linear filtering 205 with K filters, q logarithmic a posteriori probability (APP) ratios are computed at 206 for each symbol, at each time $n = 0, \ldots, L-1$, for each user $k = 1, \ldots, K$. These probabilistic quantities are defined as follows:

$$\lambda_{k,j}^i[n] \triangleq \ln \frac{Pr[d_{k,j}[n] = 1 | \hat{s}_k^i[n]]}{Pr[d_{k,j}[n] = 0 | \hat{s}_k^i[n]]}$$

and are referenced $\Lambda$ in FIGS. 9, 10 and 13;
or:

$$\lambda_{k,j}^i[n] = \ln \frac{\sum_{d \in \aleph_j^{(1)}} Pr[d_k[n] = d | \hat{s}_k^i[n]]}{\sum_{d \in \aleph_j^{(0)}} Pr[d_k[n] = d | \hat{s}_k^i[n]]}$$

into which we introduce:

$$\aleph_j^{(\varepsilon)} = \{d \in F_2^q | d_j = \varepsilon\}$$

Expanding the numerator and the denominator gives:

$$\lambda_{k,j}^i[n] = \ln \frac{\sum_{d \in A_j^{(1)}} p(\hat{s}_k^i[n] | s_k[n] = \mu(d)) Pr[d_k[n] = d]}{\sum_{d \in A_j^{(0)}} p(\hat{s}_k^i[n] | s_k[n] = \mu(d)) Pr[d_k[n] = d]}$$

The likelihoods are expressed as follows:

$$p(\hat{s}_k^i[n] | s_k[n] = \mu(d)) \propto \exp\left(-\frac{|\hat{s}_k^i[n] - \mu(d)|^2}{\hat{\sigma}_{\zeta_k}^{i2}}\right)$$

On each iteration i, a priori information on the bits of the various symbols coming from the channel decoders 209 is available and usable in the form of logarithmic APP ratios introduced beforehand and the expression for which is:

$$\pi_{k,j}^i[n] \triangleq \ln \frac{Pr^i[d_{k,j}[n] = 1]}{Pr^i[d_{k,j}[n] = 0]}$$

Assuming space-time interleaving of sufficiently great depth, we may write:

$$Pr^i[d_k[n] = d] \approx \prod_{j=1}^q Pr^i[d_{k,j}[n] = d_j] \propto \prod_{j=1}^q \left\{1 - (2d_j - 1)\tanh\left(\frac{\pi_{k,j}^i[n]}{2}\right)\right\}$$

The extrinsic information on each bit delivered by weighted output demodulators 206 intended for the channel decoder 209 is then found at 207 from the equation:

$$\xi_{k,j}^i[n] \triangleq \lambda_{k,j}^i[n] - \pi_{k,j}^i[n]$$

All the bit extrinsic information logarithmic ratios for all the blocks are then collected and properly multiplexed and de-interleaved at 205, to be sent to the channel decoder 209.

This decoder sees a unique vector $\phi^i \in \mathbb{R}^{n_o}$ made up of $N_o$ bit intrinsic probability logarithmic ratios (one for each bit of the code word v). Decoding 206 then uses an algorithm such as the flexible output Viterbi algorithm to deliver the logarithm $\lambda$ of a ratio of information APP to sent modulated data (or symbols) bits.

This logarithm $\lambda$ is then the basis on which are computed at 210a and 210b the bit extrinsic information logarithmic ratios, formally defined $\forall l = 1, \ldots, N_o$ as follows:

$$\xi_l^i \triangleq \ln \frac{Pr^i[v_l = 1 | C_o, \varphi^i / \{\varphi_l^i\}]}{Pr^i[v_l = 0 | C_o, \varphi^i / \{\varphi_l^i\}]}$$

The code word extrinsic information logarithmic ratios $\{\xi_l^i\}$ calculated in the iteration i are similar, after bit interleaving and demultiplexing 208a and 208b, to the symbol bit APP logarithmic ratios $\{\pi_{k,j}^{i+1}[n]\}$ on the next iteration.

Reception in accordance with the invention refers not only to a method for implementing it but also to the system for executing it and any transmission system incorporating that reception system.

The invention claimed is:

1. A reception method for communication over frequency-selective channels with a plurality of send antennas and a plurality of receive antennas,
wherein said reception method is adapted to process data received by the receive antennas that, on sending, was successively:
(A) modulated onto K channels, the number K being strictly greater than the number T of send antennas;
(B) spread with an N×K periodic spreading matrix (W) or an N×K aperiodic spreading matrix ($W_n$) where N is strictly greater than T, over the K-dimensional vectors of the modulated data; and
(C) processed to be transmitted from the T send antennas; and wherein the reception method uses iteratively:
  first filtering by means of T linear filters adapted to process the received data, after subtraction of a multi-antenna interference (MAI) and intersymbol interference (ISI) estimate, to generate an evaluation ($\hat{x}$) of the chips sent after the spreading of the step (B), the first filtering by means of the T linear filters taking account of the spatial diversity of the plurality of receive antennas;
  before or after said first filtering, first subtraction of interference using an estimate of multi-antenna interference (MAI) and intersymbol interference (ISI) previously regenerated from information computed on the basis of an evaluation ($\hat{s}$) of the sent modulated data generated by a previous filtering operation;
  processing that is the converse of that of the sending step (C), using a reorganization of the chips ($\hat{x}$) evaluated previously;
  second filtering by means of K linear filters adapted to process the evaluation of the chips ($\hat{x}$), after subtracting an estimate of multi-user interference (MUI), to generate the evaluation ($\hat{s}$) of the sent modulated data before the spreading of the step (B), the second filtering by means of the K linear filters taking account of the spatial diversity of the plurality of receive antennas;
  before or after said second filtering, second subtraction of interference that uses an MUI interference estimate previously regenerated from information calculated on the basis of the evaluation ($\hat{s}$) of the sent modulated data generated by previous filtering; and
  processing to generate an MAI+ISI interference estimate and an MUI interference estimate from the data received, on the basis of information calculated on the basis of said evaluation ($\hat{s}$) of the sent modulated data, the MAI+ISI interference estimate and the MUI interference estimate being then sent recursively to the next first subtraction and the next second subtraction, respectively.

2. The reception method according to claim 1, wherein the send spreading of the step (B) is effected with K strictly greater than N.

3. The method according to claim 1, wherein the reception method is adapted to process data that, on sending, was spread during the step (B), independently for each antenna and with a number of channels per antenna strictly greater than 1, the spreading matrix (W, $W_n$) is a diagonal block matrix with a number of blocks equal to the number of antennas, and the blocks are constructed from N/T orthogonal codes.

4. The method according to claim 1, wherein the reception method is adapted to process data that, on sending, was spread during the step (B) by means of a spreading full matrix (W, $W_n$) constructed from N orthogonal codes.

5. The reception method according to claim 1, wherein the T first filters are derived using the criterion of minimizing the mean square error (MMSE), the T first filters being invariant in time for a given channel.

6. The reception method according to claim 1, wherein the T first filters are matched filters (commonly called single-user matched filters (SUMF)).

7. The reception method according to claim 1, wherein the T first filters are first derived in accordance with the criterion of minimizing the mean square error (MMSE), and then become matched filters (commonly called single-user matched filters (SUMF)) from a given iteration.

8. The reception method according to claim 1, wherein the spreading of the send step (B) is effected periodically, the step (C) comprises chip interleaving, the K second filters are derived in accordance with the unconditional criterion of minimizing the mean square error, and the K second filters are invariant in time for a given channel.

9. The reception method according to claim 1, wherein the K second filters are matched filters commonly called single user matched filters (SUMF).

10. The reception method according to claim 1, wherein the spreading of the sending step (B) is effected periodically, the step (C) comprises chip interleaving, and the K second filters are first derived in accordance with the criterion of minimizing the unconditional mean square error (the K second filters thus being invariant in time for a given channel), and then become K matched filters (commonly called single-user matched filters (SUMF)) from a given iteration.

11. The reception method according to claim 1, wherein the T first filters take account in particular of the spatial diversity of the plurality of receive antennas by maximizing the signal-to-noise ratio (SNR) after filtering.

12. The reception method according to claim 1, wherein the first and/or second filters are computed using sliding windows.

13. The reception method according to claim 1, wherein the spreading of the sending step (B) is effected aperiodically and the processing of the sending step (C) comprises multiplexing onto the T send antennas without interleaving, and said converse processing on reception then comprises demultiplexing onto N channels.

14. The reception method according to claim 1, wherein the processing of the sending step (C) comprises multiplexing onto one channel, chip interleaving and then demultiplexing onto the T send antennas, and wherein said converse processing on reception then comprises multiplexing onto one channel, chip de-interleaving, and then demultiplexing onto N channels.

15. The reception method according to claim 1, wherein, on sending, the data was coded before the step (A), and on reception, said processing to generate interference estimates uses:
  weighted output processing for processing the evaluation ($\hat{s}$) of the sent modulated data and generating modulated data bit probabilistic information usable for decoding;
  decoding to generate a probabilistic quantity ($\lambda$) from said probabilistic information;
  MUI interference regeneration generating an MUI interference estimate on the basis of this probabilistic quantity ($\lambda$), this interference estimate then being sent recursively to the next second subtraction step; and
  MAI+ISI interference regeneration to generate an MAI+ISI interference estimate on the basis of the probabilistic quantity ($\lambda$) and by means of processing conforming to that of the step (C), this interference estimate then being sent recursively to the next first subtraction step.

16. The reception method according to claim 15, wherein the regeneration of MAI+ISI and MUI interference generates interference estimates from an estimate ($\overline{S}$) of the sent modulated data, which estimate ($\overline{S}$) is computed in the sense of the criterion of minimizing the mean square error (MMSE) on the basis of extrinsic information ($\xi$) that is a function of bits sent previously available after decoding.

17. The reception method according to claim 1, wherein, on sending, the data was coded and interleaved before the step (A) and, on reception, said processing to generate interference estimates uses:
  weighted output processing based on the evaluation of the sent modulated data ($\overline{S}$) and decoding statistics ($\Pi$) resulting from decoding to generate a statistic ($\Lambda$) per modulated data bit;

de-interleaving at the bit level ($\Xi$) extrinsic statistics found from the probabilistic quantity ($\Lambda$) generated previously;

weighted input and output decoding on the basis of the data de-interleaved in this way ($\phi$) to produce a probabilistic quantity ($\lambda$) over all of the bits;

interleaving at the extrinsic statistics bit level ($\xi$) found from the probabilistic quantity ($\lambda$), the new statistics ($\Pi$) thus interleaved then being sent recursively to the next step of weighted output processing;

regenerating MUI interference to generate an MUI interference estimate on the basis of an estimate ($\bar{S}$) of the sent modulated data computed in the sense of the criterion of minimizing the mean square error (MMSE) from said new interleaved statistics ($\Pi$), which MUI interference estimate is then sent recursively to the next second subtraction step; and MAI+ISI interference regeneration to generate an MAI+ISI interference estimate on the basis of the same estimate ($\bar{S}$) of the sent modulated data by means of processing conforming to that of step (C), this interference estimate then being sent recursively to the next first subtraction.

18. The reception method according to claim 15, wherein said probabilistic quantity ($\lambda$) after decoding is the logarithm of a ratio of modulated data bit information a posteriori probabilities.

19. The reception method according to claim 18, wherein decoding computes said probabilistic quantity ($\lambda$) by means of a Viterbi algorithm with weighted inputs and outputs.

20. The reception method according to claim 1, wherein the spreading of the sending step (B) is effected in the frequency domain and transmission before reception is of the multicarrier type.

21. The reception method according to claim 1, wherein the spreading of the sending step (B) is effected in the time domain and the transmission before reception is of the single-carrier type.

22. A transmission system comprising:
a sending system comprising a plurality of send antennas and adapted to modulate onto K channels, the number K being strictly greater than the number T of send antennas, and to spread with an N×K periodic spreading matrix (W) or an N×K aperiodic spreading matrix ($W_n$) where N is strictly greater than T, over the K-dimensional vectors of the modulated data;
a frequency-selective transmission channel; and
a reception system comprising a plurality of receive antennas and adapted to implement a reception method according to claim 1.

23. A reception system for communication over frequency-selective channels with a plurality of send antennas and a plurality of receive antennas,
wherein the system is adapted to process data received via the receive antennas that, on sending, was successively:
(A) modulated onto K channels, the number K being strictly greater than the number T of send antennas;
(B) spread in the time or frequency with an N×K periodic spreading matrix (W) or an N×K aperiodic spreading matrix ($W_n$) where N is strictly greater than T, over the K-dimensional vectors of the modulated data; and
(C) processed to be transmitted from the T send antennas; and
wherein the system comprises the elements:
T first linear filters adapted to process the received data, after subtraction of a multi-antenna interference (MAI) and intersymbol interference (ISI) estimate, to generate an evaluation ($\hat{x}$) of the chips sent after the spreading of the step (B), the T first linear filters taking account of the spatial diversity of the plurality of receive antennas;
upstream or downstream of said T first filters, a first interference subtractor that uses an estimate of multi-antenna interference (MAI) and intersymbol interference (ISI) previously regenerated from information computed on the basis of an evaluation ($\hat{s}$) of the sent modulated data generated by previous filtering;
processing means adapted to execute processing that is the converse of that of the sending step (C), using a reorganization of the chips ($\hat{x}$) evaluated previously;
K second linear filters adapted to process the evaluation of the chips ($\hat{x}$), after subtracting an estimate of multi-user interference (MUI), to generate the evaluation ($\hat{s}$) of the sent modulated data before the spreading of the step (B), the K linear filters taking account of the spatial diversity of the plurality of receive antennas;
upstream or downstream of said K second filters, a second interference subtractor that uses an MUI interference estimate previously regenerated from information calculated on the basis of the evaluation ($\hat{s}$) of the sent modulated data generated by previous filtering;
processing means for generating an MAI+ISI interference estimate and an MUI interference estimate from the data received, on the basis of information calculated on the basis of said evaluation ($\hat{s}$) of the sent modulated data, the MAI+ISI interference estimate and the MUI interference estimate being then sent recursively to the next first subtraction and the next second subtraction, respectively, and
wherein the elements of the reception system being adapted to be used iteratively.

24. The reception system according to claim 23, wherein the T first filters are derived using the criterion of minimizing the mean square error (MMSE).

25. The reception system according to claim 23, wherein the T first filters are matched filters commonly called single user matched filters (SUMF).

26. The reception system according to claim 23, wherein the T first filters are first derived in accordance with the criterion of minimizing the mean square error (MMSE) and then from a given iteration become T matched filters commonly called single user matched filters (SUMF).

27. The reception system according to claim 23, wherein the spreading of the sending step (B) is effected periodically, the step (C) comprises chip interleaving, and the K second filters are derived in accordance with the criterion of minimizing the unconditional mean square error, the K second filters being invariant in time for a given channel.

28. The reception system according to claim 23, wherein the K second filters are matched filters (commonly called single-user matched filters (SUMF)).

29. The reception system according to claim 23, wherein spreading of the sending step (B) is effected periodically, the step (C) comprises chip interleaving, and the K second filters are first derived in accordance with the criterion of minimizing the unconditional mean square error (the K second filters being then invariant in time for a given channel), and then become K matched filters (commonly called single-user matched filters (SUMF)) from a given iteration.

30. The reception system according to claim 23, wherein spreading of the sending step (B) is effected aperiodically, the processing of the sending step (C) comprises multiplexing onto the T send antennas, and the processing means adapted to execute processing that is the converse of that of the sending step (C) then comprise a demultiplexer onto N channels.

31. The reception system according to claim 23, wherein the processing of the sending step (C) comprises multiplexing onto one channel, chip interleaving and then demultiplexing onto the T send antennas, and wherein the processing means adapted to execute processing that is the converse of that of the sending step (C) then comprise a multiplexer onto one channel, a chip de-interleaver and then a demultiplexer onto N channels.

32. The reception system according to claim 23, wherein, on sending, the data was coded before the step (A) and on reception, said processing means for generating interference estimates comprise:
   weighted output processing means for processing the evaluation (ŝ) of the sent modulated data and generating modulated data bit probabilistic information usable by a decoder;
   a decoder for generating a probabilistic quantity (λ) from said probabilistic information;
   an MUI interference regenerator for generating an MUI interference estimate based on this probabilistic quantity (λ), this interference estimate then being sent recursively to the second subtractor; and
   an MAI+ISI interference regenerator for generating an MAI+ISI interference estimate on the basis of the probabilistic quantity (λ) by means of processing conforming to that of step (C), this interference estimate then being sent recursively to the first subtractor.

33. The reception system according to claim 23, wherein, on sending, the data is coded and interleaved before the step (A) and wherein said processing means for generating interference estimates on reception comprise:
   weighted output processing means for generating a statistic (Λ) for each modulated data bit from the evaluation (Ŝ) of the sent modulated data and decoding statistics (Π) from a decoder;
   a de-interleaver at the bit level of extrinsic statistics (Ξ) found from the probabilistic quantity (Λ) generated previously;
   a one weighted input and output decoder for producing from data de-interleaved in this way (φ) producing a probabilistic quantity (λ) over all of the bits;
   an interleaver at the bit level of extrinsic statistics (ξ) found from the probabilistic quantity (λ), new statistics (Π) thus interleaved being then sent recursively to the weighted output processing means;
   an MUI interference regenerator for generating an MUI interference estimate on the basis of an estimate (S̄) of the sent modulated data, which was computed in the sense of the criterion of minimizing the mean square error (MMSE) from said new interleaved statistics (Π), which MUI interference estimate is then sent recursively to the second subtractor; and
   MAI+ISI interference regeneration to generate an MAI+ISI interference estimate on the basis of the same estimate (S̄) of the sent modulated data by means of processing conforming to that of step (C), this interference estimate then being sent recursively to the first subtractor.

\* \* \* \* \*